(12) United States Patent
Jang et al.

(10) Patent No.: US 6,934,600 B2
(45) Date of Patent: Aug. 23, 2005

(54) NANOTUBE FIBER REINFORCED COMPOSITE MATERIALS AND METHOD OF PRODUCING FIBER REINFORCED COMPOSITES

(75) Inventors: Bor Z. Jang, Fargo, ND (US); Jun H. Liu, North Huntingdon, PA (US); Shizu Chen, Chang-Sha (CN); Zhimin M. Li, Auburn, AL (US); Hassan Mahfuz, Auburn, AL (US); Ashfaq Adnan, Tuskegee, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 10/389,261

(22) Filed: Mar. 14, 2003

(65) Prior Publication Data

US 2003/0236588 A1 Dec. 25, 2003

Related U.S. Application Data

(60) Provisional application No. 60/366,097, filed on Mar. 20, 2002, and provisional application No. 60/364,344, filed on Mar. 14, 2002.

(51) Int. Cl.[7] .............................................. G06F 19/00
(52) U.S. Cl. ....................... 700/182; 700/119; 264/109; 423/447.1
(58) Field of Search ................................. 700/119–120; 264/109; 156/64, 578, 73.2; 423/447.1; 23/314; 425/132

(56) References Cited

U.S. PATENT DOCUMENTS

| | | | |
|---|---|---|---|
| 5,121,329 A | | 6/1992 | Crump |
| 5,301,863 A | | 4/1994 | Prinz et al. |
| 5,340,433 A | * | 8/1994 | Crump ........................ 156/578 |
| 5,514,232 A | | 5/1996 | Burns |
| 5,879,489 A | * | 3/1999 | Burns et al. ................... 156/64 |
| 5,936,861 A | | 8/1999 | Jang et al. |
| 6,030,199 A | * | 2/2000 | Tseng .......................... 425/132 |
| 6,683,783 B1 | * | 1/2004 | Smalley et al. ............. 361/502 |
| 6,712,864 B2 | * | 3/2004 | Horiuchi et al. .............. 23/314 |

OTHER PUBLICATIONS

Jang, Bor Z.; "Advanced Polymer Composites"; ASM International; Dec. 1994; pp. 61–71; Materials Park, Ohio.

Klosterman, Don, Chartoff, Richard, Osborne, Nora, Graves, George, Lightman, Allan, Han, Gyoowan; "Laminated Object Manufacturing (LOM) of Advanced Ceramics and Composite"; Proceedings of the Seventh International Conference on Rapid Prototyping: Mar. 31–Apr. 3, 1997; pp. 43–50; San Francisco, California.

* cited by examiner

*Primary Examiner*—Kidest Bahta
(74) *Attorney, Agent, or Firm*—Gardner Groff, P.C.

(57) ABSTRACT

A composite composition and a method of making such a composite that is composed of a matrix material and dispersed reinforcement nanotubes that are substantially aligned along at least one specified direction or axis. Also a method for making a continuous fiber-reinforced composite object by combining a reinforcement fiber tow with a solidifying matrix material to form a pre-impregnated tow or towpreg, providing a dispensing head capable of dispensing the towpreg onto a base member positioned a distance from this head with the head and base member being driven by motion devices electronically connected to a motion controller regulated by a computer, and operating and moving the head relative to the base member to dispense multiple layers of towpreg in accordance with a CAD-generated deposition path along which the dispensing head can be allowed to trace out individual layers by following a selected algorithm so that the number of path interruptions at which the towpreg must be tentatively cut off from the dispensing head is minimized.

42 Claims, 17 Drawing Sheets

(A) fabrication of nano-phased fibers containing oriented nanotubes
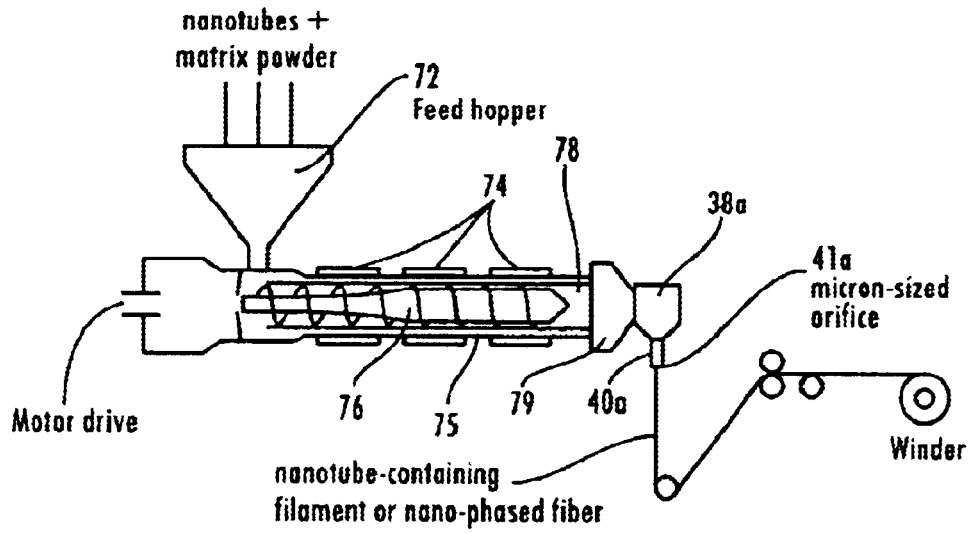
(B) fabrication of a preform from nano-phased fibers
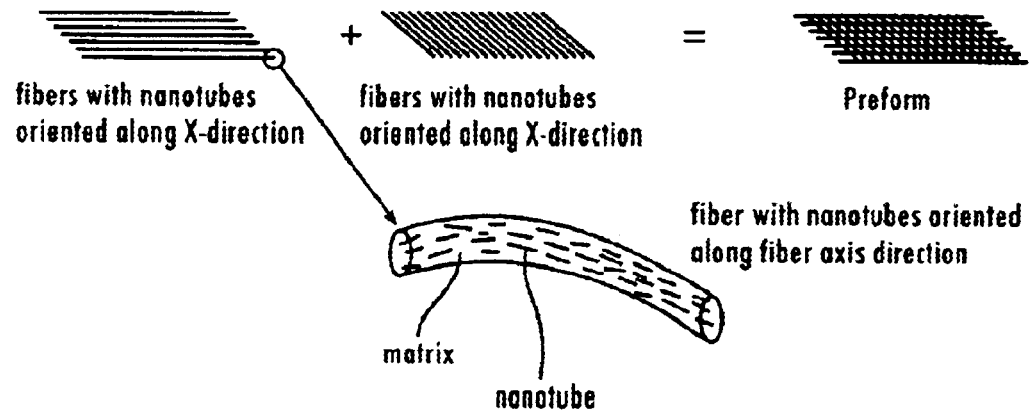
(C) fabrication of a composite by consolidating a preform
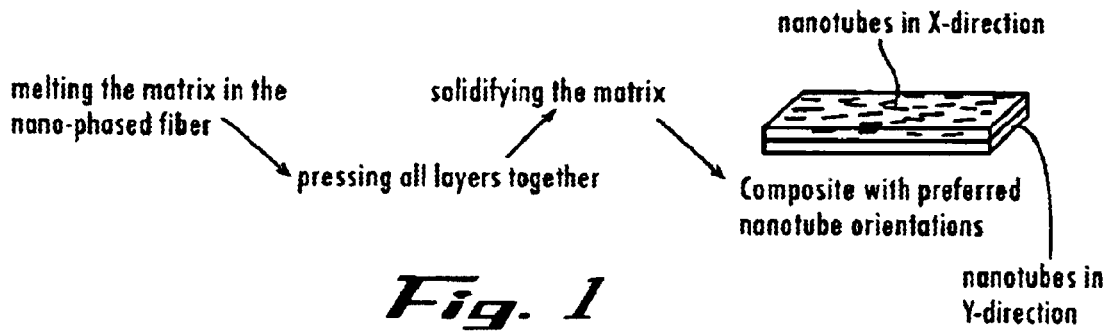
Fig. 1

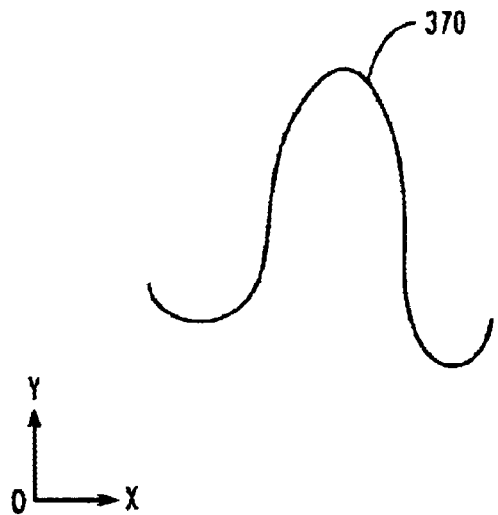 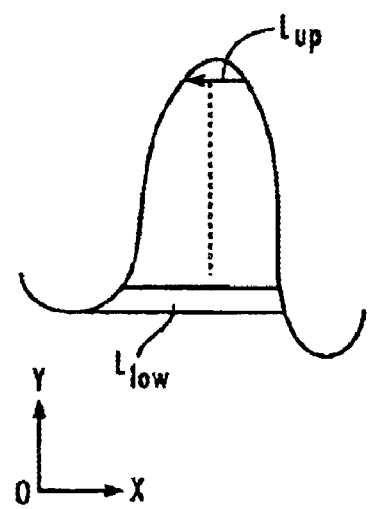
*Fig. 10A*  *Fig. 10B*
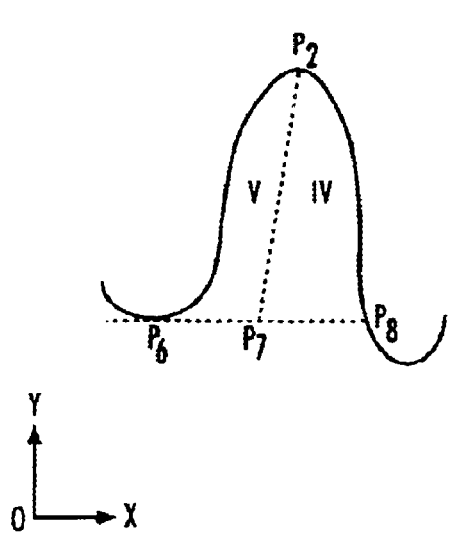 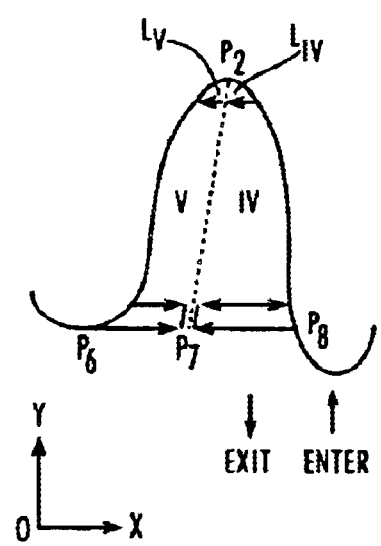
*Fig. 10C*  *Fig. 10D*

NANOTUBE FIBER REINFORCED COMPOSITE MATERIALS AND METHOD OF PRODUCING FIBER REINFORCED COMPOSITES

CROSS-REFERENCE TO RELATED APPLICATIONS

This application claims the benefit of U.S. Provisional Patent Application Ser. No. 60/364,344, filed Mar. 14, 2002, and U.S. Provisional Patent Application Ser. No. 60/366,097, filed Mar. 20, 2002, which applications are incorporated herein by reference in their entireties for all purposes.

STATEMENT REGARDING FEDERALLY-SPONSORED RESEARCH OR DEVELOPMENT

The U.S. Government has a paid-up license in this invention and the right in limited circumstances to require the patent owner to license others on reasonable terms as provided for by the terms of grant number HRD-9706871 awarded by the National Science Foundation and grant number NAS9-99065 awarded by the National Aeronautics and Space Administration.

FIELD OF THE INVENTION

The present invention relates generally to the field of materials science, and more particularly to nanotube reinforced composite materials and methods for the production of three-dimensional objects composed of continuous fiber reinforced composite materials. In particular examples of the invention, the nanotubes or nanometer-sized fibrils of the material exhibit a controlled degree of preferred orientation. The invention also provides a method of producing such compositions. In other embodiments, the invention is related to an improved layer manufacturing or solid freeform fabrication method for producing advanced fiber composite objects layer by layer.

BACKGROUND OF THE INVENTION

Carbon nanotubes are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of nanotubes as reinforcements in composite materials for both structural and functional applications would be advantageous.

It is well-known in the field of composites that the reinforcement fiber orientation plays an important role in governing the mechanical and other physical properties of a composite material or object. However, it has been found that carbon nanotubes typically tend to form a tangled mess resembling a hairball, which is difficult to work with. This and other difficulties have limited efforts toward realizing a composite material or object containing well-dispersed nanotubes with preferred orientations. It is to the provision of methods for producing composite materials or objects containing well-dispersed nanotubes with preferred orientations, and to composite materials or objects containing well-dispersed nanotube reinforcement with preferred orientations, that certain aspects of the invention are primarily directed.

Additionally, several new manufacturing processes, commonly referred to as solid freeform fabrication (SFF) or layer manufacturing (LM), have recently emerged to build parts point-by-point and layer-by-layer. These processes were developed for making models, material-processing toolings (e.g., molds and dies), and prototype parts. They are capable of producing 3-D solid objects directly from a computer-created model without part-specific tooling or human intervention. A SFF process also has potential as a cost-effective production process if the number of parts needed at a given time is relatively small. Use of SFF may reduce tool-making time and cost, and provide the opportunity to modify tool design without incurring high costs and lengthy time delays. A SFF process can be used to fabricate certain types of parts with a complex geometry which otherwise could not be made by traditional fabrication techniques such as machining, extrusion and injection molding.

Examples of SFF techniques are stereo lithography (SLa), selective laser sintering (SLS), 3-D printing, inkjet printing, laminated object manufacturing (LOM), fused deposition modeling (FDM), etc. SFF technology may be divided into three general levels of sophistication: The first is the ability to generate models or prototypes that clearly show the part design concept in three dimensions. All or most SFF techniques developed so far are capable of creating such models. The second level is the ability to produce parts that have acceptable dimensions and tolerances, and sufficient strength for preliminary evaluation in a simulated service environment. Although some progress has been made in attempting to achieve this ability, parts produced without fiber reinforcement, or with only short fibers, typically lack adequate structural integrity for many applications.

The third level is the ability to produce parts having high structural integrity and good dimensional tolerances, such that they can be placed in real operating systems. To date, little progress has been made toward fabricating SFF parts with this high level of structural integrity. Some preliminary attempts have been made to use stereo lithography-based techniques to fabricate both short and continuous fiber reinforced, UV-curable resin composites. In most cases, only composites with excessively low volume fractions of fibers are obtained using known fabrication methods and, hence, the resulting composites have exhibited low strength and stiffness, insufficient for many applications. Furthermore, such stereo lithography-based techniques typically allow use of only a laser-curable or UV-curable resin as the matrix material for a composite.

Fiber reinforced composites are known to have great stiffness, strength, damage tolerance, fatigue resistance, and corrosion resistance. However, currently available SFF technologies, in their present forms, typically do not lend themselves to the production of continuous fiber composite parts. The present invention, however, recognizes that selected SFF approaches (such as fused deposition modeling) can be modified and integrated with textile structure forming operations (such as selected fiber-laying steps in braiding, weaving and knitting) to produce parts on an essentially layer-by-layer basis. The parts produced by such a combination of SFF and textile operations, being of continuous fiber reinforced composite, are of superior structural integrity. The new processes of the present invention thus represent a major step forward toward achieving the highest level of sophistication in SFF.

The SFF techniques that potentially can be used to fabricate short fiber or particulate reinforced composite parts include fused deposition modeling (FDM), laminated object manufacturing (LOM) or related lamination-based process, and powder-dispensing techniques. As presently understood, the FDM process (e.g., U.S. Pat. No. 5,121,329; 1992 to S. S. Crump, incorporated herein by reference) operates by employing a heated nozzle to melt and extrude out a material such as nylon, ABS plastic (acrylonitrile butadiene-styrene) and wax in the form of a rod or filament The filament or rod is introduced into a channel of a nozzle inside which the rod/filament is driven by a motor and associated rollers to move like a piston. The front end, near a nozzle tip, of this piston is heated to become melted; the rear end or solid portion of this piston pushes the melted portion forward to exit through the nozzle tip. The nozzle is translated under the control of a computer system in accordance with previously sliced CAD data to trace out a 3-D object point by point and layer by layer. In principle, the filament may be composed of a fiber or particulate reinforcement dispersed in a matrix (e.g., a thermoplastic such as nylon). In this case, the resulting object would be a short fiber composite or particulate composite. The FDM method has been hitherto limited to low melting materials such as thermoplastics and wax and has not been practiced for preparation of metallic parts, possibly due to the difficulty in incorporating a high temperature nozzle in the FDM system.

Modified laminated object manufacturing (LOM) has been used to prepare polymer matrix and ceramic matrix composites (D. Klosterman, et al, in Proceedings of The $7^{th}$ International Conference on Rapid Prototyping, Mar, 31, 1997 –Apr. 3, 1997, San Francisco, Calif., U.S.A., ed. By R. P. Chartoff, et al.; pp.43–50 and pp.283–292, incorporated herein by reference). As presently understood, the process involves, for instance, feeding, laminating and cutting thin sheets of prepregs (preimpregnated fiber preform) in a layer-by-layer fashion according to computer-sliced layer data representing cross sectional layers of a 3-D object. The process cycle typically consists of laminating a single sheet of prepreg to an existing stack, laser cutting the perimeter of the part cross section, and laser-dicing or "cubing" the waste material. After all layers have been completed, the part block is removed from the platform, and the excess material is removed to reveal the 3-D object This process results in large quantities of expensive prepreg materials being wasted.

In U.S. Pat. No. 5,514,232, issued May 7, 1996, incorporated herein by reference, Burns discloses a method and apparatus for automatic fabrication of a 3-D object from individual layers of fabrication material having a predetermined configuration. As presently understood, each layer of fabrication material is first deposited on a carrier substrate in a deposition station. The fabrication material along with the substrate are then transferred to a stacker station. At this stacker station the individual layers are stacked together, with successive layers being affixed to each other and the substrate being removed after affixation. One advantage of this method is that the deposition station may permit deposition of layers with variable colors or material compositions. In real practice, however, transferring a delicate, not fully consolidated layer from one station to another would typically tend to shift the layer position and distort the layer shape. The removal of individual layers from their substrate also tends to inflict changes in layer shape and position with respect to a previous layer, typically leading to inaccuracy in the resulting part.

In U.S. Pat. No. 5,301,863 issued on Apr. 12, 1994, incorporated herein by reference, Prinz and Weiss disclose a Shape Deposition Manufacturing (SDM) system. As presently understood, the system contains a material deposition station and a plurality of processing stations (for mask making, heat treating, packaging, complementary material deposition, shot peening, cleaning, shaping, sand-blasting, and inspection). Each processing station performs a separate function such that when the functions are performed in series, a layer of an object is produced and is prepared for the deposition of the next layer. This system requires an article transfer apparatus, a robot arm, to repetitively move the object supporting platform and any layers formed thereon out of the deposition station into one or more of the processing stations before returning to the deposition station for building the next layer. These additional operations in the processing stations tend to shift the relative position of the object with respect to the object platform. Further, the transfer apparatus may not precisely bring the object to its exact previous position. Hence, the subsequent layer may be deposited on an incorrect spot, thereby compromising part accuracy. The more processing stations that the growing object has to go through, the higher the chances are for the part accuracy to be lost. Such a complex and complicated process typically makes the over-all fabrication equipment bulky, heavy, expensive, and difficult to maintain. The equipment typically also requires attended operation, adding to expense.

In the composite manufacturing industry, numerous conventional methods are being practiced to produce continuous fiber reinforced composites. All of these methods are believed to have disadvantages or shortcomings. For example, the hand lay-up process is labor-intensive and the quality of the resulting composite part depends highly upon the skills of an operator. The combined process of prepreg preparation, cutting, lay-up, vacuum bagging, and autoclave or press curing is notoriously tedious, lengthy, and energy-intensive. In resin transfer molding (RTM), a dry reinforcement material, originally in the forms of roving, mat, fabric, or a combination, is cut and shaped into a preform The preform is then pre-rigidized by using a small amount of fast-curing resin to hold its shape during the subsequent operations. The preform is then placed in a mold, the mold is closed and resin is then injected into it. Resin must flow through the small channels inside a normally tightly-configured preform, expelling the air in the mold cavity, impregnating the preform and wetting out the fibers. The RTM process suffers from several drawbacks. First, it typically requires execution of two separate processes: preform preparation and resin impregnation. Complete impregnation of a dense or large-sized preform by a viscous resin can be very difficult. Second, it typically requires utilization of a mold, which is normally quite costly. Third, RTM typically is not suitable for fabricating complex-shaped parts (e.g., part with a hollow cavity).

Processes such as filament winding and pultrusion can be highly automated. However, filament winding generally is essentially limited to fabrication of convex-shaped hollow structures such as pressure vessels. Pultrusion can produce a variety of reinforced solid, tubular, or structural profiles. Unfortunately, these structures are essentially limited to be of a constant cross-section. Both filament winding and protrusion typically are not well-suited to production of complex-shaped parts. Although fiber placement and robotic tape-laying techniques can overcome some of the shortcomings of filament winding, they typically require the utilization of expensive, large and heavy equipment. The fiber placing or tape laying head is typically of a complex configuration and, hence, is easily subject to malfunction. These two techniques typically require highly specialized control software that is not usable with any other material processing machine. An overview of various composite processing techniques is available in B. Z. Jang, "Advanced Polymer Composites: Principles and Applications," ASM International, Materials Park, Ohio, December 1994, incorporated herein by reference.

In summary, currently available SFF technologies, generally speaking, do not lend themselves to the production of continuous fiber composite parts. In general, current composite processing techniques are not capable of producing parts of a complex geometry, or producing parts of a specified geometry directly from a computer-aided design. Accordingly, it has been found desirable to develop a process and apparatus that can be used to fabricate continuous fiber reinforced composite parts of high structural integrity and complex geometry. It is further desirable that the process also has the capability of producing a three-dimensional object automatically in response to the computer-aided design of the object. These objectives can be achieved to some extent by the composite layer manufacturing (CLM) method of U.S. Pat. No. 5,936,861, Aug. 10, 1999 to Jang, et al., incorporated herein by reference. The CLM method involves mixing a fiber tow with a solidifying matrix material to form a pre-impregnated tow or "towpreg" and depositing the towpreg point by point and layer by layer on an object-supporting base member.

The present invention provides significant improvements in many aspects over the method disclosed in U.S. Pat. No. 5,936,861. For example, in one aspect, the present invention provides an effective method of generating the tool path (deposition path) along which a pre-impregnated tow is dispensed and deposited. The method minimizes the requirements for halting the deposition operation to cut off the towpreg tentatively from a dispensing nozzle and then to re-start the deposition operation at a different location.

SUMMARY OF THE INVENTION

Briefly described, example embodiments of the present invention provide improved methods of making a composite composition or object that includes a matrix material and dispersed nanotubes as a reinforcement phase. The nanotubes preferably are substantially aligned along at least one specified axis or direction. The method preferably includes: (a) providing a mixture of nanotubes and a matrix material in a fluent state, (b) extruding the mixture through a small orifice under a high shear force to form a long or continuous-length filament, (c) aligning a selected number of the filament segments along at least one preferred direction to form a nanotube-matrix preform, wherein the filament segments are substantially parallel to each other and to the at least one preferred direction, and (d) consolidating the preform to produce the composite composition.

In this method, the matrix material of the mixture can be maintained in either a molten state or solution state (containing a liquid solvent) so that the mixture is sufficiently fluent to be extruded out through a small orifice having a diameter preferably in the range of 0.1 $\mu$m to 50 $\mu$m. Such a high-shear extrusion results in the formation of a continuous filament with nanotubes preferentially aligned along the filament axis. A textile operation such as weaving, braiding, knitting, winding, and combinations thereof is then executed to align segments of the resulting filament along at least a preferred direction (say, the X-direction of an X-Y-Z Cartesian coordinate system) or two preferred directions (say, X- and Y-directions) to form a filament preform. The preform is then heated to melt out the matrix material with the resulting preform pressurized or compressed into a desired shape, which is then followed by cooling to solidify the matrix material. This step is similar to the consolidation step of a traditional textile structural composite.

The composite composition is composed of a matrix material and preferably 0.5% to 50% by volume of nanotubes with the nanotubes having their length or elongate axis being substantially parallel to each other along at least one specified direction or axis. Preferably, at least 50% out of the nanotubes have their elongate axis being inclined at an angle of 15 degrees or less with respect to the at least one specified direction or axis. In one preferred embodiment, the structure of the composite is composed of at least two layers with the first layer containing nanotubes aligned predominantly along a first specified direction or axis (e.g., X-direction) and second layer containing nanotubes aligned predominantly along a second specified direction or axis (e.g., Y-direction). In a three-directional composite, the nanotubes have their elongate axis being along at least three specified directions or axes. The matrix material may be, for example, selected from the group consisting of organic, polymeric, metallic, ceramic, glass, carbonaceous materials and/or combinations thereof.

In other embodiments, the present invention provides a method for building a complex-geometry composite object essentially point-by-point and layer-by-layer. The process preferably includes: (1) combining a reinforcement fiber tow with a solidifying matrix material to form a pre-impregnated tow (hereinafter referred to as towpreg); and (2) dispensing the towpreg at a controlled rate from a dispensing head (nozzle) onto a base member or a preceding layer already deposited on this base member in a predetermined sequence to form a multiple-layer object. This sequence is preferably determined by first creating a geometry (drawing) to represent the shape and dimension of a desired three-dimensional (3-D) object. The geometry data file, comprising essentially a collection of point coordinates and vectors, is then sliced into a number of logical layers with each layer having a predetermined thickness and cross-section. These layer data are then sorted out and organized into a proper sequence to define the deposition paths of the dispensing head. These deposition path data are subsequently converted to become programmed signals by a computer-aided design computer and supporting software programs. These programmed signals define the dispensing and deposition paths of the towpreg in an essentially point-by-point and layer-by-layer fashion. The dispensing of the towpreg and the solidification of the matrix are permitted to occur in such a manner that the newly deposited towpreg segment is bonded to a previously deposited segment and the new layer is bonded to a previous layer to form a multiple-layer object.

Other embodiments of the present invention provide new and useful ways of sorting and organizing layer data for a more efficient deposition of a towpreg. These sorting and organizing algorithms are advantageous due to the fact that the towpreg is a continuous strand of fibers and a solidifying matrix material. After a solid area on a layer cross-section is formed, the dispensing head (nozzle) typically must traverse from this finished area to a new area to re-initiate the dispensing and deposition procedure. Before such a traversal from one area to another occurs, the towpreg at the last finishing point typically must be cut off so that the towpreg will not continue to be pulled out of the dispensing nozzle; otherwise, this could result in erroneous or redundant deposition of towpreg along the traversal line. The towpreg will come out of the nozzle again when it is ready to start building a different area. Such points of scission or interruption preferably must be kept to a minimum in order to achieve a more efficient and accurate deposition operation.

Drive means such as electric motors are preferably provided to selectively move the base member and dispensing head relative to each other in a predetermined pattern along the "X" and "Y" axes of an X- Y -Z Cartesian coordinate system as the towpreg material is being dispensed to form each successive layer. In this coordinate system, the X- Y plane is defined by a first (X-) direction and a second (Y -) direction that are mutually perpendicular. Individual layers of the 3-D object being built lie substantially parallel to the X- Y plane. The thickness direction of these layers is perpendicular to the X- Y plane and is parallel to the Z-direction. As desired, movements along a specific angle with "X" or "Y" axis may be executed during the formation of each layer. Also as desired, relative vertical movements along the "Z" axis may be carried out during the formation of each layer, as well as at the completion of each layer to achieve a desired layer shape (surface profile) and thickness.

Such mechanical movements are preferably achieved through programmed signals inputted to the drive motors for the base member and the dispensing head from a computer or controller-supported by a computer-aided design/computer-aided manufacturing system. Such a CAD/CAM system preferably contains software to design and create the object to be formed. Specifically, the software is preferably utilized to convert the 3-D shape of an intended object into multiple layer data. However, software to convert the multiple layer data to programmed signals through a controller to the drive motors for dispensing the towpreg at a controlled rate along a predetermined deposition path is not known to commercially available at present. Thus, the present invention provides methods for generating efficient deposition paths of a dispensing nozzle in a predetermined sequence. In order to facilitate a clear description of the present invention, relevant terms are described as follows:

3-D Solid Model: A solid model is a geometric representation (drawing) of a 3-D object. The model preferably contains information about the shape and dimensions of the object. A 3-D solid model may be created by using a computer-aided design (CAD) approach, reverse engineering, topological information and/or mathematical equations, etc.

Slicing: A 3-D solid model can be sliced into a plurality of constituent layers with each layer having its own cross-sectional shape (profile and dimensions) and a layer thickness. The cross-sectional shape can be defined by a set of points, line segments, curves and/or other geometry entities in the X- Y plane. The data specifying such a layer contains a predetermined number of (x,y) coordinates at a given z value. In many cases, the layer data also contains additional information such as vectors that define the orientation of a geometry entity (e.g., the normal to a triangle, direction of a line segment and nature of a contour). The fact that each layer has a finite thickness value often leads to the opinion that such a layer represents a 2.5 dimensional entity.

Contour: Contours represent the boundaries of various solid areas and empty areas (holes) within a layer. They may be classified as internal (interior) and external (exterior) contours (see FIG. 2). For a correct interpretation of the geometry data, each Contour must be closed and must not intersect itself or another contour.

Raster segments: In each layer, one may draw a set of parallel straight lines along a selected direction (e.g., along the X-axis direction as indicated in FIG. 7B). Each of these parallel lines normally intersect with a contour at two points, except at the contour extremities. These points of intersection may be connected to form a set of successive line segments, each having a start point and an end point (e.g., FIG. 7C). The purpose of defining these raster segments is to determine the deposition paths of a material dispensing nozzle for physically forming individual layers of a 3-D object.

Path interruption: Path interruption is a location at which the deposition path of a towpreg dispensing nozzle has to be discontinued temporarily. At this finishing point, the towpreg-dispensing operation is stopped tentatively so that the towpreg can be cut off from the dispensing nozzle. This would allow the dispensing nozzle to traverse from this point to another point (a new starting point) without having to pull out any additional length of towpreg. At this new starting point, the towpreg-dispensing operation will resume for building another area of the same layer or a new layer. Such a path interruption is necessary in a situation where an area has been built (e.g., the area confined by the left circular contour in FIG. 11B having been filled with a towpreg material) and the nozzle is ready to move from this area to another area (e.g., to begin to deposit the towpreg in the solid area inside the right external contour of FIG. 11B). Between these two external contours there should not be any material. Such an empty region (or area) in a layer cross-section is often referred to as a negative region (or negative area) in the field of SFF. The area enclosed by an external contour of a selected layer excluding those enclosed by internal contour (s) of the same layer, if any, is defined as a positive solid area.

In the presently invented method, the towpreg is controlled to be dispensed into the positive solid area(s) essentially point by point and layer by layer, so that a continuous fiber reinforced composite object can be formed. The towpreg-dispensing nozzle can be controlled to move along proper deposition paths. The deposition paths can be generated in terms of a raster segment approach, a contour offset approach, a sub-area approach, a spiral fashion, or a combination thereof, which are discussed in detail at a later section. These approaches are herein developed to ensure the deposition paths be as continuous as possible to dispense the towpreg with a minimum number of interruptions.

In the raster segment approach, a set of successive raster segments is needed for a positive solid area to be built. They are generated by drawing a series of parallel straight lines with each line intersecting a contour at two points. A raster segment is formed inside a solid area by connecting two neighboring points of intersections (the start point and end point). The movement of a towpreg-dispensing nozzle along the raster segment paths must be as continuous as possible. An embodiment of the presently invented method to make continuous chains of raster segments includes three rules: (a) a raster segment can be linked to another raster segment if and only if they are consecutive (next) to each other; (b) a link is possible only between the end point of a raster segment and the start point of the next raster segment, in that order; and (c) a raster segment can be linked to another raster segment if and only if the two points to be connected originate from the same contour. The dispensing operation continuously goes from one raster segment to another until one of the three rules is violated, which signifies one path interruption and the dispensing operation has to be discontinued temporarily. The dispensing will resume from a new raster segment until all the raster segments have been processed. This procedure is repeated until one layer is built. Then, the dispensing will go forward to the next layer until the whole object is formed.

The dispensing and deposition operations can be executed continuously and without any path interruption in each positive solid area by following a sub-area method. This method comprises the following steps: (a) drawing connecting lines among some of the extremity points (where either X- or Y-coordinate value is mathematically a local maximum or minimum) of the external contour and those of the internal contour(s) in each positive solid area (this step can be skipped if there is no internal contour in this positive solid area); (b) drawing connecting lines between selected extremity points and tangent lines that are tangential at corresponding neighboring extreme points of the same contour without any other intersections with the contour; (c) dividing the positive solid area into several sub-areas according to the connecting lines and tangent lines; (d) generating dispensing paths in each sub-area; and (e) dispensing the towpreg from one sub-area to other sub-areas without any path interruptions by following proper dispensing paths formed in each sub-area in a predetermined sequence.

A data file can be used to store the sequence of deposition paths. This data file is then convened to the programmed signals, such as the standard NC G-codes and M codes commonly used in computerized numerical control (CNC) machining industry, through a machine controller or indexer to regulate the moving and dispensing operations of a nozzle. Once the dispensing is discontinued temporarily, a specific signal is used to control a cutting means, such as a laser beam, a mechanical cutter or an electrical heating wire, to cut off the towpreg near the point of interruption. In this way, a continuous fiber reinforced composite object can be built continuously or with a minimum number of path interruptions.

In the case where portion of an object can be divided into two parts (e.g., FIG. 10), two or more positive solid areas can exist in one layer cross-section of an object. Provided that the space between neighboring positive solid areas in all layers is sufficiently large for a dispensing head to maneuver around, the towpreg can be dispensed to deposit one solid area of one part first. Once this area is completed, then the nozzle will build corresponding solid areas of consecutive layers of the same part. Once this first part is completed, the nozzle is moved over to build another part from the lowest up to the top layer. Individual layers and the whole object can be formed area by area and part by part by using this strategy with a minimum number of path interruptions possible.

In order to produce parts having high structural integrity, the towpreg in a different region of a layer or in a different layer can be oriented along a different direction. Opportunities also exist for inserting different towpreg materials at different strategic locations. The type, orientation, and volume fraction of the fibers can be selected to meet the dimensional accuracy requirement (e.g., a required coefficient of thermal expansion value) and structural property requirements (e.g., strength and stiffness). This selection can be accomplished by using the CAD software that incorporates composite mechanics programs. Composite design software programs that are capable of predicting properties of a composite (given fiber orientation, properties, and proportion, and corresponding matrix properties) are widely available from various commercial sources and research institutions.

Example applications of the methods and materials of the present invention include, without limitation:

Fabrication of Processing Tools (Molds and Dies, etc.): The present invention provides a process by means of which the nozzle tracing motions, commonly used in FDM and inkjet printing-based SFF, can be integrated with proper fiber movement and fiber-matrix mixing operations to build complex-geometry composite parts essentially layer-by-layer. Such a SFF-based technology can be employed as a cost-effective way of producing tools and molds that are composed of continuous fiber reinforced composites. Advanced fiber reinforced polymer and metal matrix composites normally have great specific stiffness (modulus-to-density ratio), specific strength (strength-to-density ratio), creep and fatigue resistance, and fracture toughness. A prototype part or tool made from an advanced composite will be of superior structural integrity and durability. Further, composite mechanics and design approaches have advanced to the state that, by judiciously selecting fibers (some having a negative coefficient of thermal expansion, CTE, in the axial direction) and their orientations, one can readily produce composites with a desired CTE (e.g., zero CTE). Zero-CTE materials such as INVAR (iron-nickel alloy) have been shown to meet thermal and durability requirements and are used in current aircraft production programs. INVAR tooling, however, is very expensive and requires a long fabrication lead-time. The presently invented technology will permit cost-effective, rapid fabrication of durable tools, which themselves are made from continuous fiber composites with thermal characteristics that are compatible with those of the intended composite parts.

More Realistic Prototyping: The present invention also provides more realistic prototyping. In the cases where the production part is composite material-based, a prototype part being similar in both composition and microstructure to the production part can be fully evaluated to verify its fitfunction-form before mass production begins. This could help eliminate the possibility of producing a large number of parts only to find out that these parts do not meet the requirements.

Fabrication of Composite Parts of Complex Shape without Using a Mold or Die: The present invention further provides a potentially cost-effective composite fabrication process. Most of the current composite processing techniques are not capable of manufacturing structural parts of a complex geometry. SFF concepts provide effective approaches to the production of complex composite structures without part-specific tooling or human intervention. Cost-effective processing techniques will significantly broaden the scope of application for composites. This new technology will permit the production of custom manufactured parts and tools on demand. This technology can be used to fabricate a part when and where it is needed.

Faster and More Cost-Effective Model Making: In one embodiment, the process of the present invention involves coating a mono-filament or a small tow of just a few filaments with a photo- or ultraviolet-curable resin to form a coated fiber or impregnated fibers, collectively referred to as a pre-impregnated tow. This pre-impregnated tow is then pulled to deposit onto a base member or a previously deposited layer in a point-by-point and layer-by-layer fashion. Immediately upon deposition of a segment of the pre-impregnated tow, the resin in this segment is exposed to an ultraviolet (UV) beam for rapid curing. The resin quickly solidifies and adheres to a previous segment and/or a previous layer. As compared to other SFF processes such as stereo lithography (SLa), the present technique has several advantages. First, only a small amount of UV-curable resin is needed in the process of model making. Up to approximately 70% of the model volume can be occupied by a less expensive. fiber (e.g., polyester fiber and clothing string); requiring only 30% or less UV-curable resins which are known to be much more expensive than polyester fibers. The UV-curable resins used for SLa are even much more expensive than other types of UV-curable resins commonly used in the adhesive industry. Second, UV-curable resins are known to undergo volume shrinkage when being cured. With a 70% fiber solid in place (which does not shrink when the resin is cured), the total curing shrinkage is significantly curtailed. Third, an UV beam can only penetrate a resin liquid to a limited extent and still remain effective in initiating or catalyzing the cure reactions of the resin. If only a thin layer of resin, coated on a fiber surface, needs to be UV-cured, the-curing process can be significantly accelerated. This implies that the process of the present invention, when applied to model making from an UV-curable resin, can be completed faster and more cost effectively.

In example embodiments, the present invention provides a method of dispersing and aligning nanotubes in a matrix material. Other embodiments of the present invention provide a composite composition that contains reinforcement nanotubes with a controlled degree of preferred orientation. Further embodiments of the present invention provide a multi-directional composite composition with carbon nanotubes exhibiting a preferred orientation along at least one direction. Embodiments of the present invention also provide a multi-directional composite composition with carbon nanotubes exhibiting a preferred orientation along two directions. Further embodiments of the present invention provide a multi-directional composite composition with carbon nanotubes exhibiting a preferred orientation along three directions. Embodiments of the present invention also provide an improved method wherein a three-dimensional object can be constructed from resin-, glass-, ceramic-, or metal-impregnated continuous fibers in an essentially layer-by-layer manner. Further embodiments of the invention automatically produce a physical object from a 3-D solid model created by using a computer-aided design (CAD) approach. And embodiments of the present invention provide an improved SFF method wherein the dispensing paths of pre-impregnated continuous fiber tows can be automatically traced out with a minimum number of path interruptions for forming a three-dimensional fiber reinforced composite object point by point and layer by layer.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWING FIGS.

FIG. 3 shows an apparatus for making three dimensional (3-D) objects from advanced fiber composite materials according to an example embodiment of the present invention.

Figure 7A:
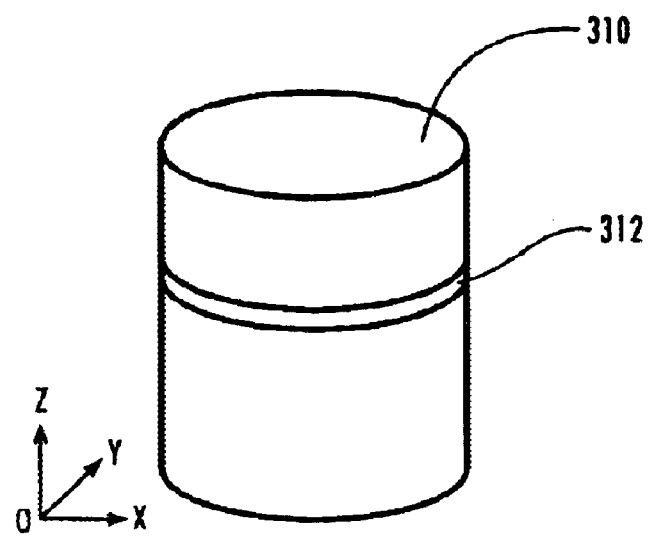
FIG. 7(A) shows a cylindrical object to be built according to an example form of the present invention.
Figure 7B:
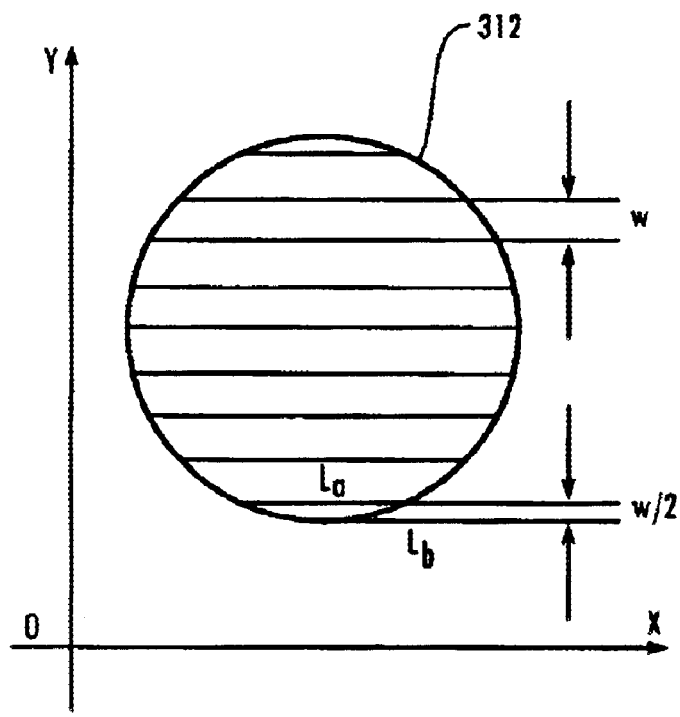
FIG. 7(B) shows one layer of the object with several parallel lines along the "X" axis according to an example form of the present invention.
Figure 7C:
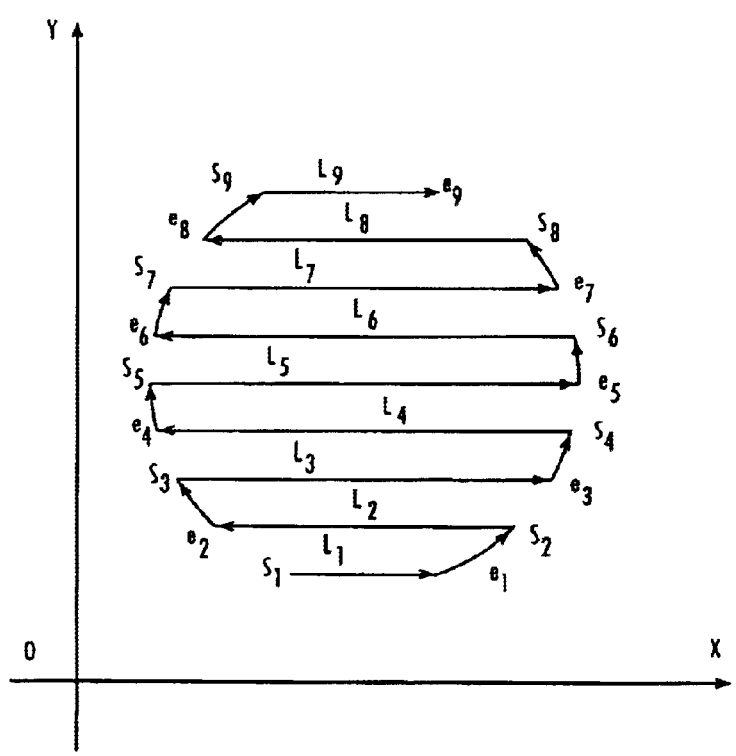
FIG. 7(C) shows the formation of raster segments and a dispensing sequence of the layer of FIG. 7(B) according to an example form of the present invention.
Figure 7D:
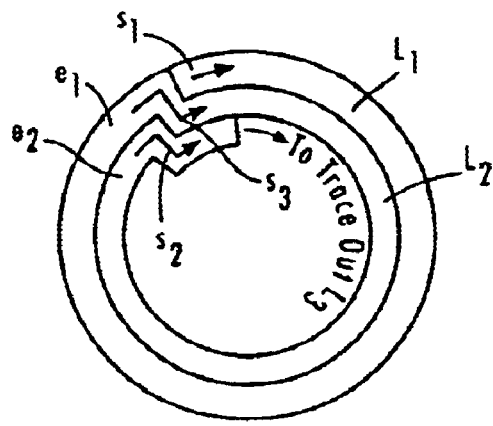
FIG. 7(D) shows contour offset dispensing paths according to an example form of the present invention.
Figure 7E:
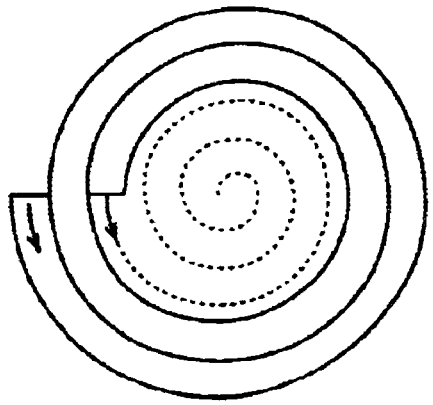
Figure 7F:
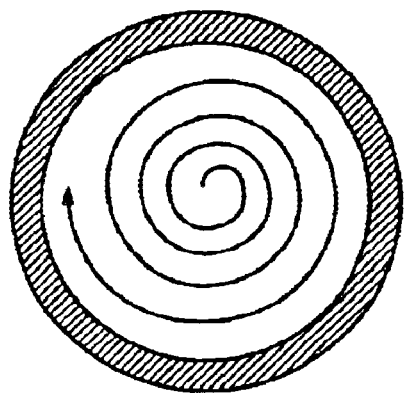

FIGS. 7(E) and 7(F) show dispensing paths in the spiral fashion according to an example form of the present invention.

Figure 8A:
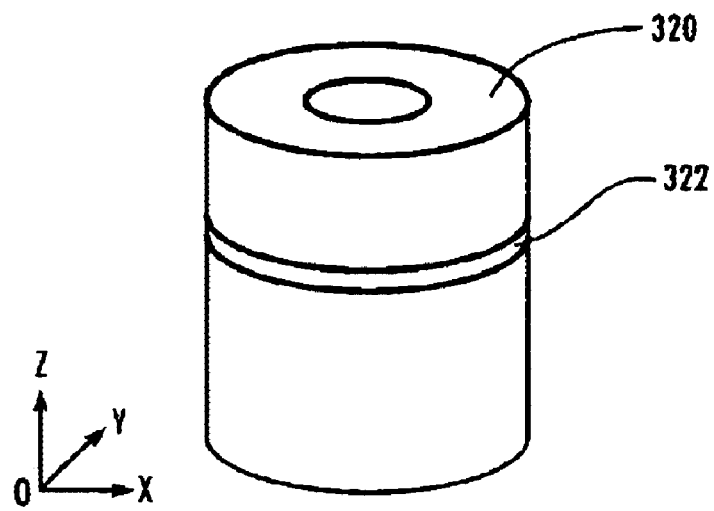

FIG. 8(A) shows a hollow cylindrical object with one through hole to be built according to an example form of the present invention.

Figure 8B:
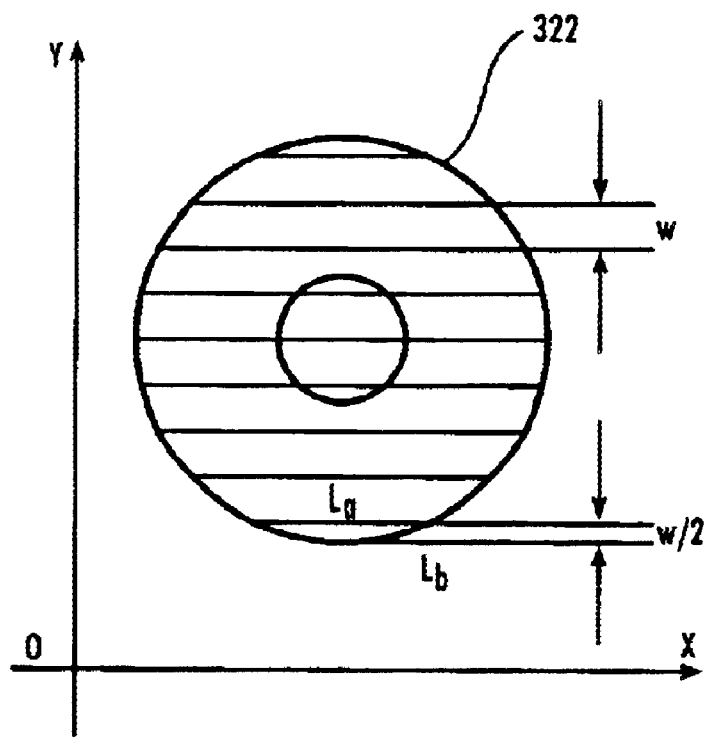

FIG. 8(B) shows one layer of the object with parallel lines along the "X" axis.

Figure 8C:
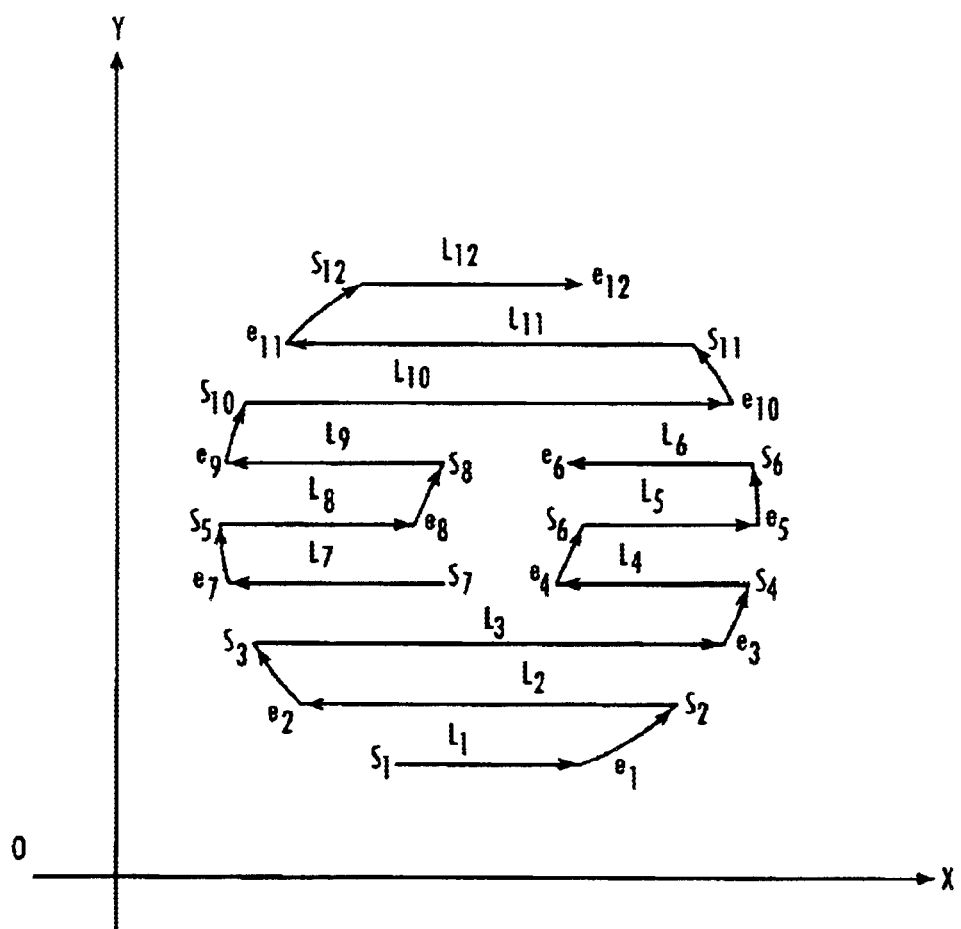

FIG. 8(C) shows the formation of the raster segments and dispensing sequence of this layer.

Figure 8D:
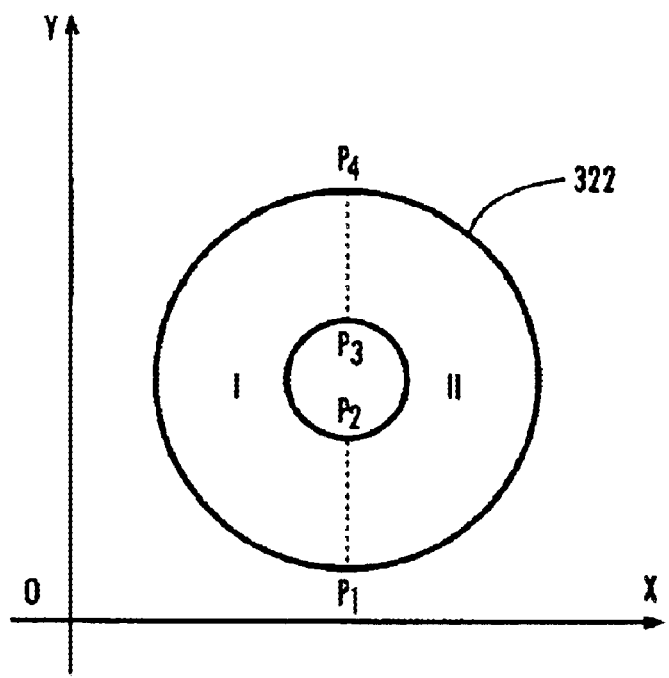

FIGS. 8(D) & (E) show dispensing paths by the sub-area method.

Figure 9A:
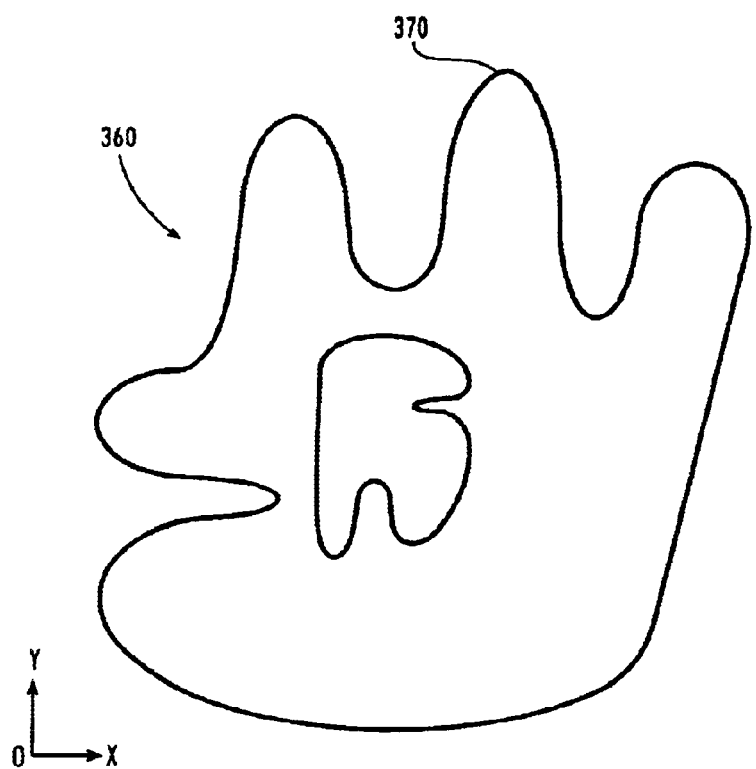

FIG. 9(A) shows a cross section of an object with convex and concave parts to be formed according to an example embodiment of the present invention.

Figure 9B:
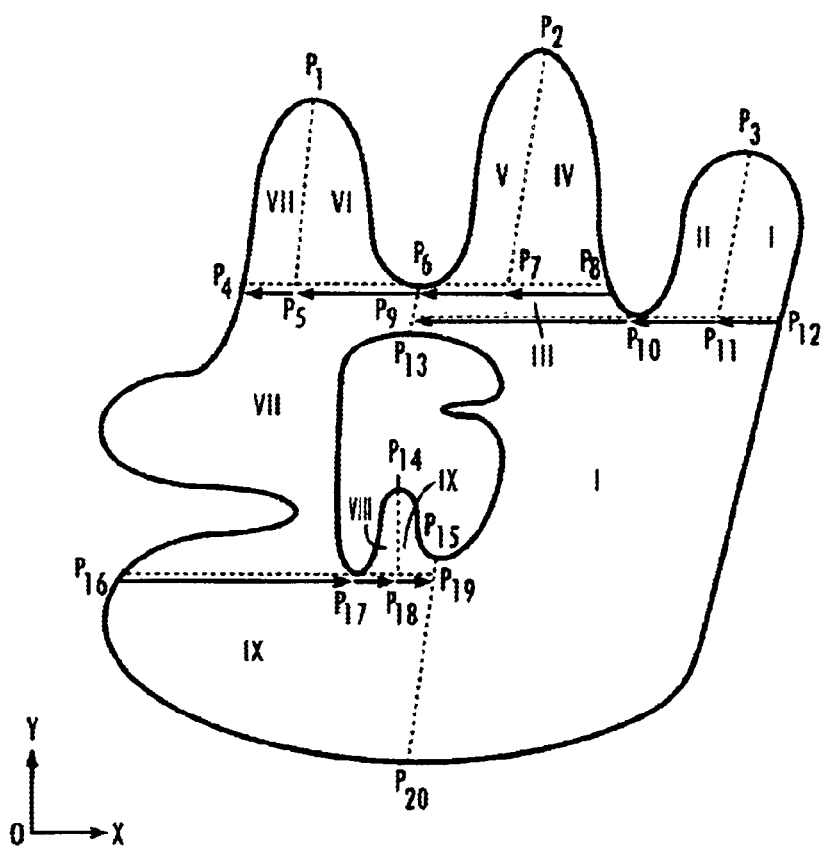

FIG. 9(B) shows division of this cross section into several sub-areas according to an example form of the present invention.

FIG. 10(A) shows an upper-middle convex part 370 of an external contour of an object to be formed according to an example embodiment of the present invention.

FIG. 10(B) shows dispensing paths of the convex part without dividing into sub-areas.

FIG. 10(C) shows sub-areas of this convex part.

FIG. 10(D) shows dispensing paths of this convex part by the sub-area method.

Figure 11A:
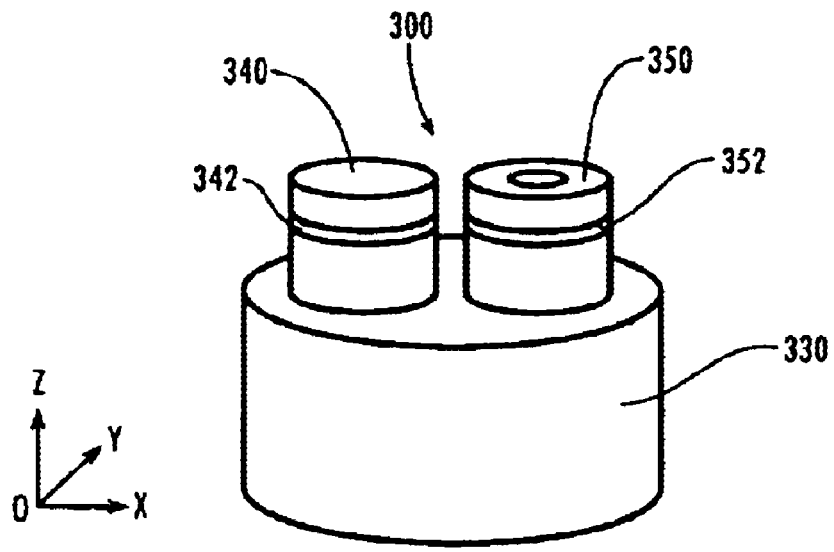

FIG. 11(A) shows an object to be built according to an example embodiment of the present invention, with one solid cylinder on the bottom and two cylinders on the top. Of the two top cylinders, one is solid and the other has one through hole.

Figure 11B:
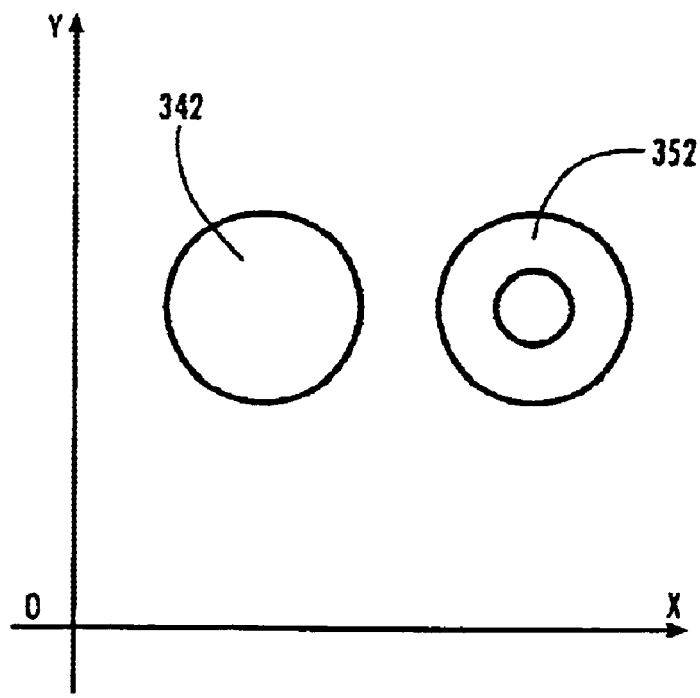

FIG. 11(B) shows one layer of the object corresponding to a portion of the top two cylinders.

Figure 12:
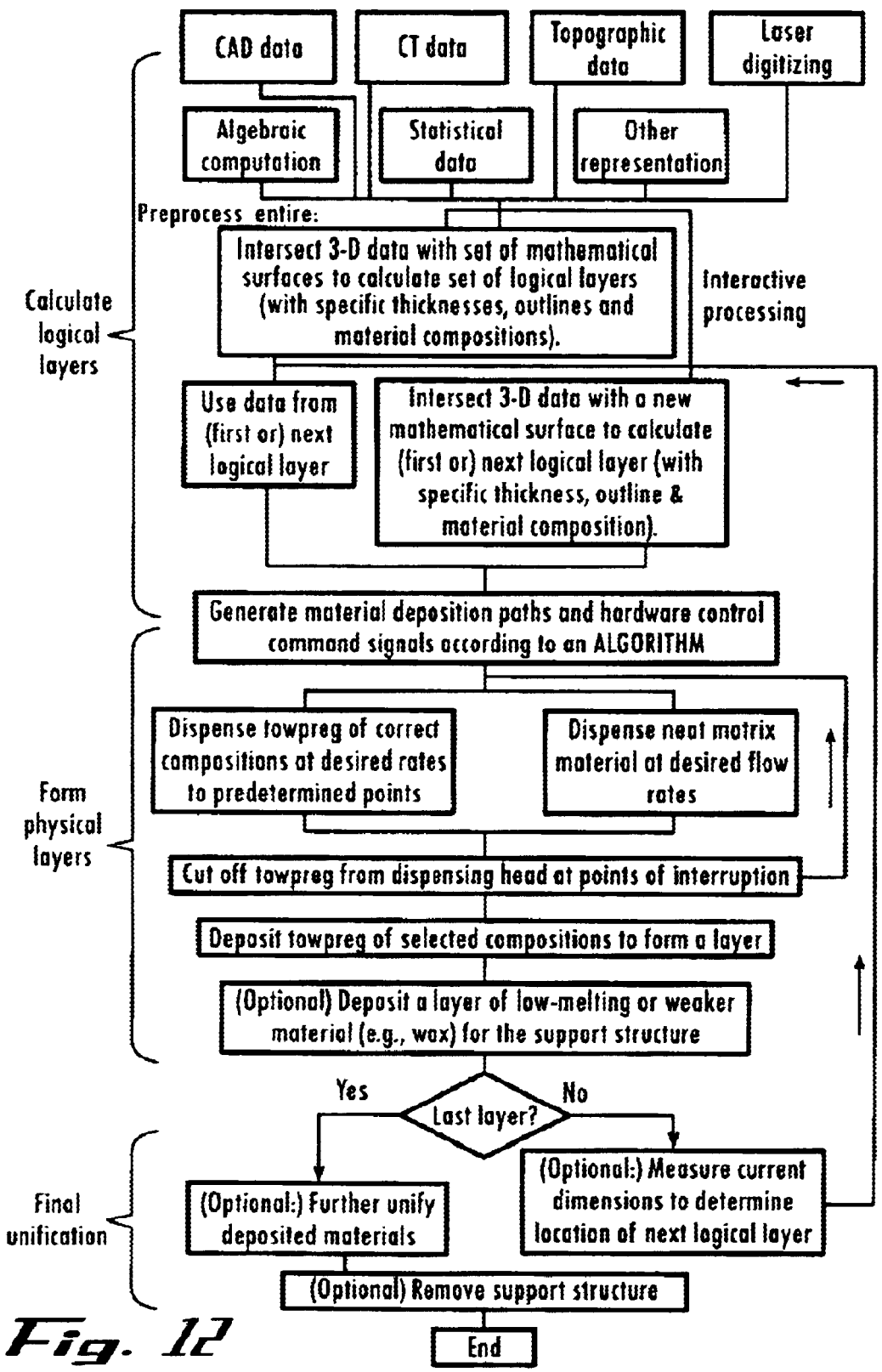

FIG. 12 shows a flow chart according to an example form of the present invention.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 4:
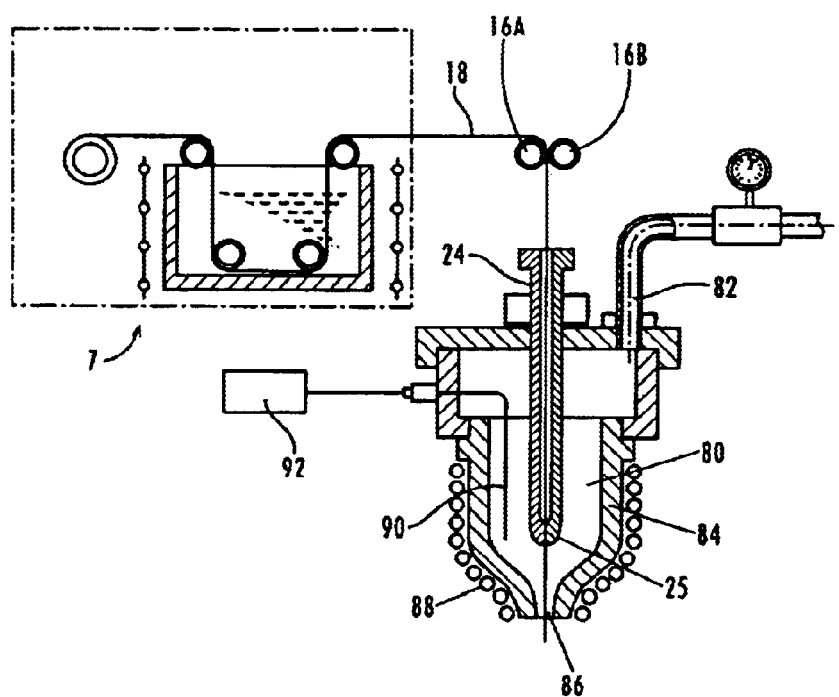
FIG. 4 shows a sectional view of a nozzle design according to an example embodiment of the present invention.

FIG. 3 illustrates one embodiment of a system or apparatus according to the present invention for making three-dimensional objects that are primarily composed of continuous fiber reinforced polymer-or metal-matrix composite materials. This apparatus begins with a supply of reinforcement fibers and a matrix material, plus a blender or other means for mixing said reinforcement fibers and matrix material to form a continuous tow of impregnated fibers. To make a fiber-reinforced thermoset resin composite article, for instance, a continuous strand roving of fibers may be pulled from a fiber spool 4, or a plurality of spools supplying multiple strands that are merged into one tow 12. The tow is directed to submerge into a resin bath 9 that contains a liquid mixture 11 of a resin, curing agent and, as needed, other ingredients such as colorant, ultraviolet stabilizer, and fire retardant. Advantageously, the fiber tow is pulled through a series of roller means 6, 8, 10A, 10B, 14, 16A, 16B, which act to guide the movement of the tow, promote resin impregnation into the fiber tow, and squeeze out the excess resin. This step produces a continuous supply of a resin-impregnated tow 18. The fiber tow-impregnating system (including rollers, resin bath, and optional heating means) is schematically shown in FIG. 4 and collectively represented by a numeral 7.

Preferably, selected rollers are equipped with motor means to help drive the movement of the fiber tow. The impregnated tow is driven to enter one end 26 of a moveable head (a nozzle 22) having flow-passage means therein. FIG. 4 shows a sectional view of a possible nozzle design. The flow passage means advantageously comprises a hollow guiding rod (a tube 24) to direct the movement of the impregnated tow. This guiding tube preferably has a changeable tip 25 at its opposite end. This tube is partially enclosed in a temperature-controlled region of the nozzle. The bottom part of the nozzle has a small cell 80 to optionally accept additional matrix material (if necessary) that is transported through an opening 82 from an extrusion or resin transfer device. The flow pattern and pressure in this cell are designed to provide additional dragging force to assist in "extruding" the softened towpreg out of the nozzle for deposition. Preferably, the changeable tip 25 of the guiding tube is designed so that it acts as a check valve to prevent back flow of liquid from said cell to the guiding tube 24.

Figure 5:
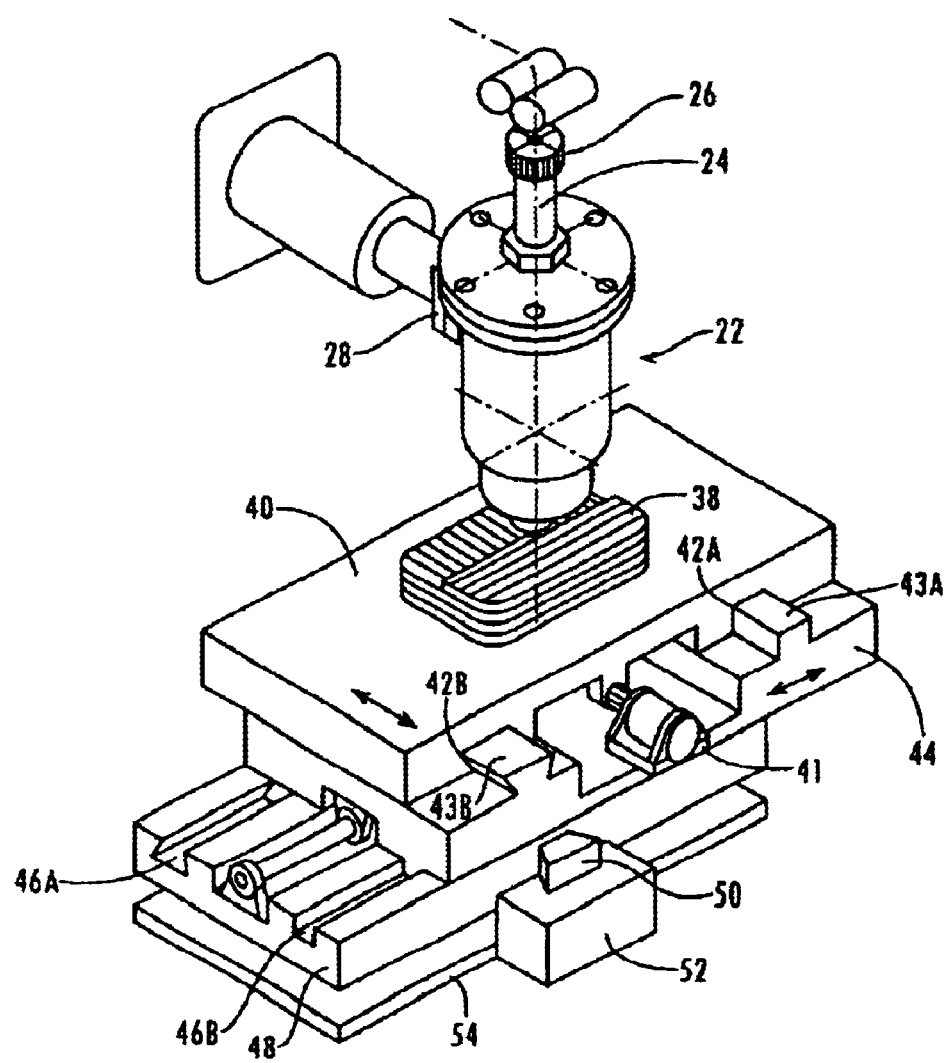
FIG. 5 shows a perspective view of a nozzle-base member portion of the apparatus shown in FIG. 2, according to an example form of the present invention.

Connected to the opposite end of the nozzle is a dispensing outlet 84 comprising a tip with a discharge orifice 86 of predetermined size. The impregnated tow goes through a passage 24 of the nozzle and eventually exits from the orifice 86 of the nozzle to deposit onto either a base member 40 or a previously formed layer (e.g. top layer of an object 38 being formed) on the base member (FIGS. 3 and 5). Further referring to FIG. 4, a heating provision (heating elements 88) is attached to, or contained in, the nozzle to control the advancement of curing reactions so that the resin will have sufficient viscosity or rigidity to avoid excessive spreading upon deposition onto a previous layer. A temperature sensing means (e.g. a thermocouple 90) and a temperature controller 92 can be employed to regulate the temperature of the nozzle. Further preferably, the resin chemistry is controlled so that the resin substantially "solidifies" soon after dispensing. Fast-curing thermosetting resins are commercially available. Optionally, a separate heating device can be utilized to accelerate the curing process of the deposited layers.

Advantageously, the dispensing outlet 84 may be designed so that the tip can be readily removed and replaced with another tip with a discharge orifice of a different size. Such an adjustable tip is desirable because an operator may choose to use different tow sizes or different fibers to build different components.

Referring again to FIG. 5, the base member 40 is located in close, working proximity to the dispensing outlet of the movable head (the nozzle 22). The upper surface of the base member 40 preferably has a flat region sufficiently large to accommodate the first few layers of impregnated tow. The base member and the nozzle are equipped with mechanical drive means for moving the base member relative to the movable head in three dimensions along "X," "Y," and "Z" axes in an X- Y -Z Cartesian coordinate system defined by three mutually perpendicular X-, Y -and Z-directions in a predetermined sequence and pattern, and for displacing the nozzle a predetermined incremental distance relative to the base member. This can be accomplished, for instance, by allowing the base member to be driven by a linear motion device, which is powered by a stepper motor to provide movements along the "X" axis. As an example, schematically shown in FIG. 5 is a base member with two slots 42A, 42B extending along the "X" axis and being guided by two corresponding tracks 43A, 43B of a supporting base member 44. A stepper motor 41, attached to said supporting base member 44, is employed to move the base member 40 along the "X" axis. The supporting base member 44 is, in turn, provided with a second linear motion mechanism, driven by a second stepper motor to provide movements along the "Y" axis. For instance, the supporting base member 44 can be directed to slide on two parallel slots 46A, 46B, extending along the "Y" axis, of another reversibly slidable base member 48. This supporting base member 48 is further provided with another drive means to provide "Z"-axis movements. Any similarly configured mechanical means can be utilized to move the member 48 reversibly in the vertical direction (along the "Z" axis). Simplistically shown at the lower portion of FIG. 5 is a protruded rail 50 (attached to, or integral with, member 48), which slides vertically on a "Z"-axis slot of a post 52. The post is connected to or integral with a sturdy base 54.

FIG. 3 shows that the nozzle 22 is supported, through an adapter 28, by non-movable supporting means (an arm 32, a post 36, and a base 34). Alternatively, one, two, or three Of the mechanical drive means can be provided to the nozzle (rather than the base member 40. or supporting base members 44,48) to effect relative movements between the base member 40 and the nozzle 22. The base member and its mechanical drive means may be supported by a sturdy base 54 with little or no vibration when the base member moves. Instead of stepper motors. many other types of drive means can be used, including linear motors. servo motors, synchro motors, D.C. motors, and fluid motors.

Z-axis movements are effected to displace the nozzle relative to the base member and, hence, relative to each layer deposited prior to the start of the formation of each successive layer. This will make it possible to form multiple layers of impregnated tow of predetermined thickness, which build up on each other sequentially as the matrix material solidifies after discharge from the orifice. The rate at which the impregnated tow is discharged from the discharge orifice onto the base member is dictated by the linear speed of the fiber tow on the surface of the roller, which is driven by a motor. This linear speed can be adjusted, by varying the motor rotational speed, to meet the possible needs of variable rate at which the nozzle moves with respect to the base member.

As another embodiment of the present invention, the apparatus as previously defined may comprise a plurality of nozzles each having flow-passage means therein connected to a dispensing outlet at one end thereof. The dispensing outlet for each additional nozzle may comprise a tip with a discharge orifice of a predetermined size therein. Each additional nozzle is provided with a separate supply of reinforcement fibers and a matrix material, and means for introducing the reinforcement fibers and matrix material into the flow-passage so that the matrix material is in a fluid state just prior to discharge. This can be accomplished by employing a similarly configured fiber spools (giving out rovings of different fiber types or fiber counts), resin bath (containing a resin of possibly different composition), and separate sets of rollers.

Figure 6:
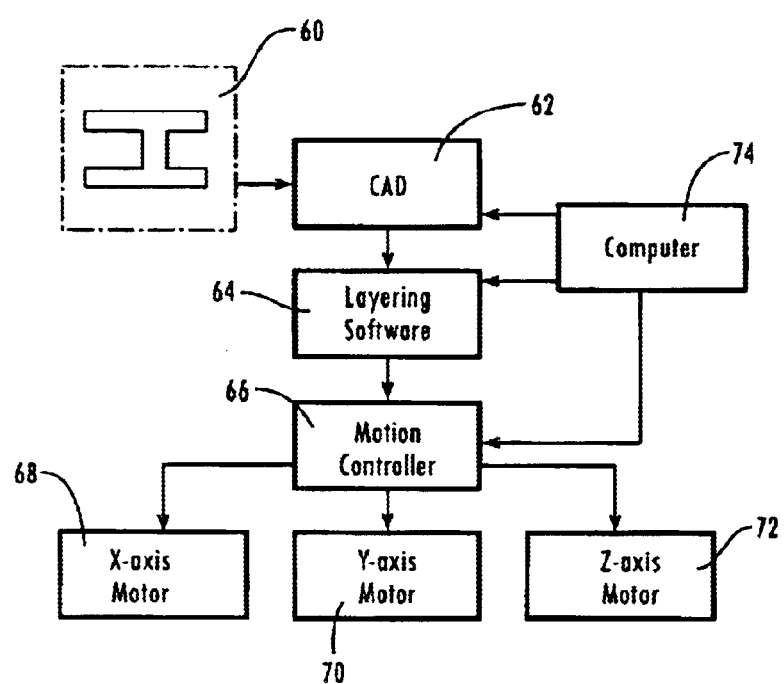
FIG. 6 shows a flow chart of a sequence of creating a 3-D object by a CAD software program, establishing layer-by-layer database by layering software, and sending out motion-controlling signals by a computer to the three drive motors through a motion controller according to an example embodiment of the present invention.

A preferred embodiment of the present invention contains any impregnated tow-dispensing apparatus as described in this section, but further comprising a computer-aided design (CAD) computer 74 and a motion controller 66. As schematically shown in FIG. 6, the CAD computer with its supporting software programs 62,64 operates to create a three-dimensional drawing of a desired object 60 or model and to convert the drawing into multiple elevation layer data. Specifically, the design of a three-dimensional object 60 is inputted into the computer utilizing commercially available CAD software 62. The object design is sectioned into multiple layers by a commercially available software program 64. Each layer has its own shape and dimensions. These layers, when combined together, will reproduce the complete shape of the intended object. Numerous software programs have become available that are capable of performing the presently specified functions. For example, AUTOLISP can be used to convert AUTOCAD drawings into multiple layers of specific patterns and dimensions. A company named CGI (Capture Geometry Inside, currently located at 15161 Technology Drive, Minneapolis, Minn.) provides capabilities of digitizing complete geometry of a three-dimensional object and creating multiple-layer data files.

The three-dimensional motion controller 66 is electronically linked to the mechanical drive means 68, 70, 72 and is operative to actuate the mechanical drive means in response to "X," "Y" and "Z" axis drive signals for each layer received from the CAD computer. Controllers that are capable of driving linear motion devices are commonplace. Examples include those commonly used in a milling machine.

Thermoplastic and metal matrix composite articles can also be made in a similar fashion with some modifications to the process and related apparatus. Further background information in this regard is available from U.S. Pat. No. 5,936,861, which is incorporated herein by reference.

A preferred embodiment of the present invention includes an improved method for generating the deposition paths, as illustrated in FIG. 7. A solid cylinder 310 is to be built layer by layer with individual layers being parallel to the X- Y plane in an X- Y -Z Cartesian coordinate system defined by three mutually perpendicular X-, Y -and Z-directions (FIG. 7A). A 3-D solid model of this object as designed by a CAD software may be sectioned into multiple layers by a slicing program. FIG. 7B shows the cross-section of one layer 312 of this object. There is only one external contour and no internal contour on this layer. The area enclosed by this external contour is a positive solid area. In order to generate efficient deposition paths, a series of parallel lines along the "X" axis direction are formed with the distance between two neighboring lines preferably being approximately the width (w) of a towpreg to be dispensed. For instance, the distance between line $L_a$ and the nearest parallel line $L_b$ (tangential to the exterior contour at an extremity point with a minimum "Y" coordinate value) approximately equals to half width (w/2) of the towpreg.

Each of these parallel lines intersects a contour of this selected layer at two points. Raster segments are then formed by connecting two neighboring points. As shown schematically in FIG. 7C, nine raster segments $L_1$–$L_9$ are formed. Each raster segment is essentially a vector having its direction defined from its start point (s) to its end point (e). The directions of two consecutive raster segments are different; for example, the start point ($s_1$) of raster segment $L_1$ has a smaller "X" coordinate than its end point ($e_1$) while the start point ($S_2$) of segment $L_2$ has a larger "X" coordinate than its end point ($e_2$). The two lines, $L_1$ and $L_2$, happen to have opposite directions. The dispensing nozzle is to be controlled to trace out each raster segment from its start point to its end point. One may choose to start out the dispensing operation from the raster segment having an extremity point (e.g., segment $L_1$ with the minimum "Y" coordinate) to its consecutive raster segment (e.g., $L_2$). Following this method, the dispensing then goes to $L_3$, $L_4$, . . . , until this selected layer is deposited completely at the end of segment $L_9$. Then the dispensing operation will re-start at one point of a subsequent layer. Such a strategy forms one of the presently developed algorithms with which deposition paths of a dispensing nozzle can be determined. The above sequence of deposition paths, once determined, is stored in a data file. This data file is then converted to proper programmed signals for controlling the movement of a dispensing nozzle, so that a continuous fiber reinforced composite object can be built with a minimum number of path interruptions.

Another embodiment of the present invention includes a contour offsetting algorithm for continuously depositing a towpreg to form a solid area with few or no path interruption. As indicated in FIG. 7D, a towpreg-dispensing nozzle is directed to trace out the first contour path $L_1$ from a starting point $s_1$ to an ending point $e_1$, then move inward to a second starting point $S_2$ (slightly different in location from $s_1$ or "off-set" from $s_1$) for tracing out the second path $L_2$, and then off-set to a third starting point $S_3$. This procedure is continues until all the paths are traced out possibly at the center of a solid area. The tracing step may begin from approximately the center, off-setting outward until the exterior contour is completed.

Still another embodiment of the present invention includes a spiral path forming algorithm for continuously deposition a towpreg to form a solid area with a minimum number of path interruptions. As shown in FIG. 7E, a towpreg-dispensing nozzle is directed to move inward from outside in a spiral fashion until it ends near the center of this solid area. Alternatively, the spiral path may start from the center, moving outward until the outside contour is traced. Preferably, an exterior contour path is first deposited to ensure a smooth exterior surface before the towpreg-dispensing nozzle is slightly off-set inward for subsequently starting out a spiral path (FIG. 7F). Such an algorithm is one of the many combination strategies that can be used for forming nozzle movement paths.

Another preferred embodiment for generating dispensing paths is shown in FIG. 8. A hollow cylinder 320 with one through hole is to be built (FIG. 8A). The 3-D solid model of the object is sectioned into multiple layers by a proper software program; the cross-sectional shape of one such layer 322 being shown in FIG. 8B. There are one external contour and one internal contour on this layer. The area enclosed by the external contour excluding that enclosed by the internal contour is a positive solid area. In order to generate deposition paths, a series of parallel lines along the "X" axis direction are formed with the spacing between two neighboring lines being the width (w) of the towpreg. The distance between the line $L_b$ having a minimum "Y" coordinate value and the nearest parallel line $L_a$ equals to half width (w/2) of the towpreg. Each line intersects the contour curves on this selected layer at two or four points (two with exterior contour and the other two with interior contour). As schematically shown in FIG. 8C, the line segments in the positive solid area are the raster segments ($L_1$ to $L_{12}$). Each raster segment has a direction from its start point (s) to its end point (e). The directions of two consecutive raster segments are different. For instance, the start point ($s_1$) of raster segment $L_1$ has a smaller "X" coordinate value than its end point ($e_1$), while the start point ($S_2$) of raster segment $L_2$ has a larger "X" coordinate than its end point ($e_2$) and, hence, $L_1$ and $L_2$ have different directions. The dispensing procedure may start from the raster segment having the lowest "Y" coordinate; i.e, $L_1$. Since the start point $S_2$ of the consecutive raster segment $L_2$ lies on the same contour (e.g., same exterior contour) as the end point $e_1$ of raster segment $L_1$, the dispensing nozzle goes from $L_1$ to its neighboring raster segment $L_2$, then $L_3$ until $L_6$ consecutively. Since the start point ($s_{10}$) of a neighboring raster segment $L_{10}$ of segment $L_6$ is not on the same internal contour as the end point ($e_6$) of raster segment $L_6$, the dispensing is discontinued temporarily at $e_6$. The dispensing nozzle will restart from the raster segment $L_7$ that has not been dispensed before and has a smallest "Y" coordinate value among the un-traced area. This procedure will proceed to $L_8$ and eventually finish at the end of $L_{12}$. Then, the dispensing nozzle will go forward for building a subsequent layer. The whole object can be formed by using this strategy. In this algorithm, the dispensing procedure is just with one path interruption in each layer.

A data file is used to store the sequence of dispensing paths. This data file is then converted to the programmed signals to control the movement of a dispensing nozzle. Once the dispensing is discontinued temporarily, such as after raster segment $L_6$ has been dispensed, a cutting means such as a laser beam, a mechanical cutter or an electrical heating wire will be used to cut off the towpreg. Then the dispensing will restart from raster segment $L_7$.

Figure 8E:
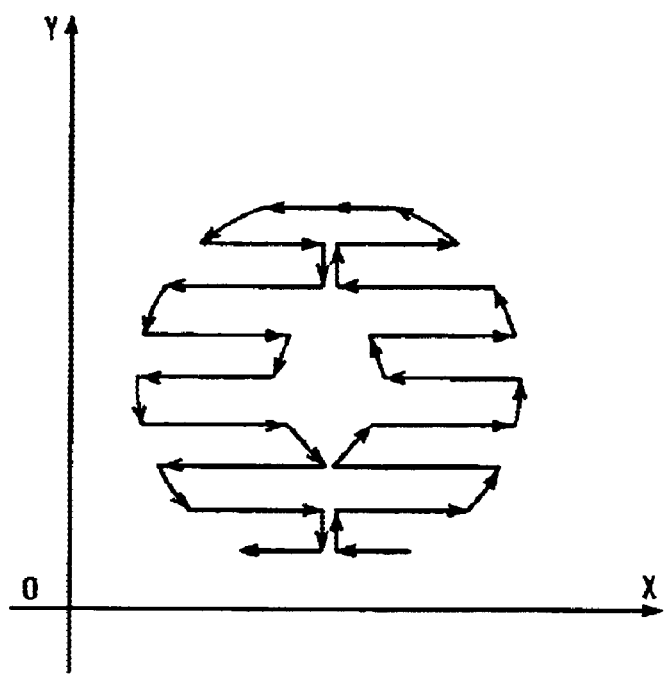

The dispensing can also be realized with a minimum number of path interruptions by using a sub-area method. Referring to FIG. 8D, a positive solid area can be divided into two or more sub-areas (e.g., sub-areas I and II in this diagram) by drawing connecting lines between the extreme value points (e.g., $P_1$, $P_4$) of an external contour and those (e.g., $P_2$, $P_3$) of an internal contour. Dispensing can proceed in one sub-area first and then go over to another sub-area without any path interruption. In each sub-area, a towpreg-dispensing nozzle is directed to trace out a path obtained by the raster segment method. For example, as shown in FIG. 8E, raster segment paths are obtained in such a way that the towpreg-dispensing procedure begins with sub-area II. Once sub-area 11 is traced out, this algorithm permits the dispensing head to move over to sub-area I and continuously trace out sub-area I without any interruption. This is in contrast to the method used in FIG. 8C that requires one interruption at the end of segment $L_6$.

Another example to illustrate the sub-area method for generating dispensing paths is shown in FIG. 9 in which one layer 360 of an object is to be built. Again, this layer lies parallel to the X- Y plane of a Cartesian coordinate (FIG. 9A). This layer is composed of one external contour and one internal contour, both with a series of convex and concave curve parts. The two contours demarcate one positive solid area. As shown in FIG. 9B, if raster segments parallel to the "X" axis are intended to be formed, then the convex curve parts of the external contour and concave parts of the internal contour that have a Y -coordinate extreme value point (collectively called convex/concave curve areas) will have a path interruption. The contour curves of these areas are characterized by the presence of (a) at least two local extremity points having a maximum or minimum X- or Y-coordinate value (at which dy/dx=0 or dx/dy=0) and/or (b) at least one point of inflection (at which $\delta^2y/\delta x^2$ =0 or $\delta^2x/\delta y^2$ =0) where a curve changes from concave upward to concave downward or from concave downward to concave upward. To illustrate this notion, let us take the upper-middle convex portion 370 of the external contour as an example (FIG. 10A). Assume that this part will be deposited with a continuous towpreg starting from raster segment $L_{low}$ having a lowest "Y" coordinate value to the uppermost raster segment $L_{up}$ (FIG. 10B). The dispensing nozzle enters from the lower portion of this region, working its way up to the upper portion and cannot exit from this region without having to cut off the towpreg at an ending point (e.g., end of $L_{up}$). That is to say, the dispensing step must be tentatively discontinued at this ending point with the towpreg being cut off and the dispensing head being moved over to another region of the layer.

To achieve a continuous tool path without interruption, one may choose to follow another sub-area algorithm by further dividing an irregular curve area (such as 370) into two sub-areas, IV and V (FIG. 10C and 10D). These two sub-areas may be created by drawing line $P_6P_8$ that is parallel to the "X" axis. This line is tangential at the extreme value point $P_6$ to the neighboring concave part and intersects the convex contour (370) at point $P_8$. Another line is drawn from the extreme value point $P_2$ of the convex part 370 to intersect line $P_6P_8$ at point $P_7$ (this second line is inclined with respect to $P_6P_8$ at a non-zero angle and intersects the contour 370 only at one point $P_2$). In this manner, this convex part can be divided into two sub-areas IV and V. Sub-area IV is enclosed by straight lines $P_2P_7$  $P_7P_8$ and curve $P_8P_2$ and sub-area V is bounded by straight lines $P_2P_7$, $P_7P_6$ and curve $P_6P_2$ (FIG. 10 (C)). In this case, a towpreg-dispensing nozzle may be allowed to enter from sub-area IV and exit from sub-area V, as shown in FIG. 10D. If the deposition of sub-area IV is completed with raster segment $L_{iv}$ and resumed in sub-area V with segment $L_v$, then $L_{iv}$ and $L_v$ must be in the same direction. To meet this requirement, the distance between neighboring raster segments may be slightly larger than the width of the towpreg.

According to the above algorithm, the positive solid area in FIG. 9A can be divided into nine sub-areas, I–IX. This is done by dividing each of the following contour curve parts into two sub-areas: three convex parts of the external contour and one concave part of the internal contour that have an extremity point with a minimum "Y" coordinate value. One then proceeds to connect the extreme value point $P_6$ with $P_{13}$ and $P_{15}$ with $P_{20}$ (FIG. 9B). The convex or concave parts that have extreme value points of "X" coordinate will not lead to any path interruption if raster segments are selected to be parallel to the "X" axis. Hence, it is not necessary to divide them into two sub-areas. The dispensing sequence of this layer can be as follows: I, II, III, IV, V, VI, VII, VIII and IX. The direction of selected special raster segments are indicated in FIG. 9B. By following this sequence, the dispensing procedure can be continuous without any path interruption.

Figure 2:
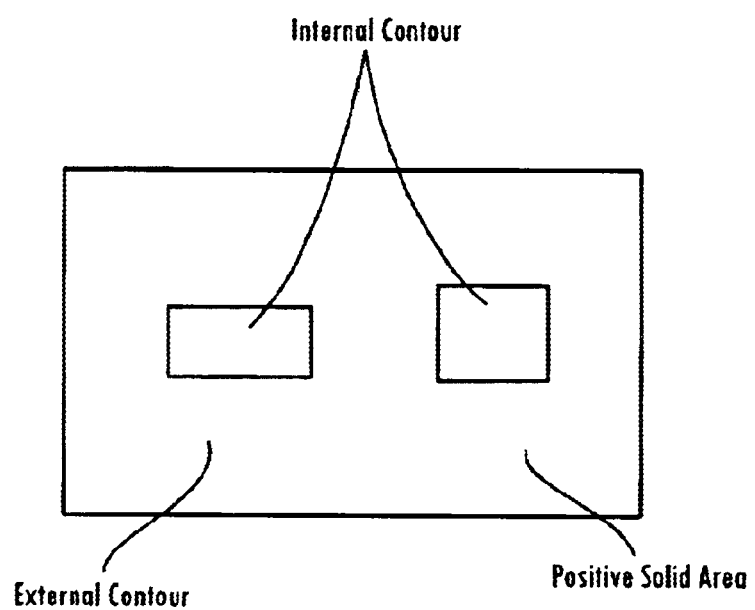
FIG. 2 shows a layer of an object with both external and internal contours, according to an example form of the present invention. Enclosed inside internal contours are holes or negative areas of a layer cross-section.
Figure 1:
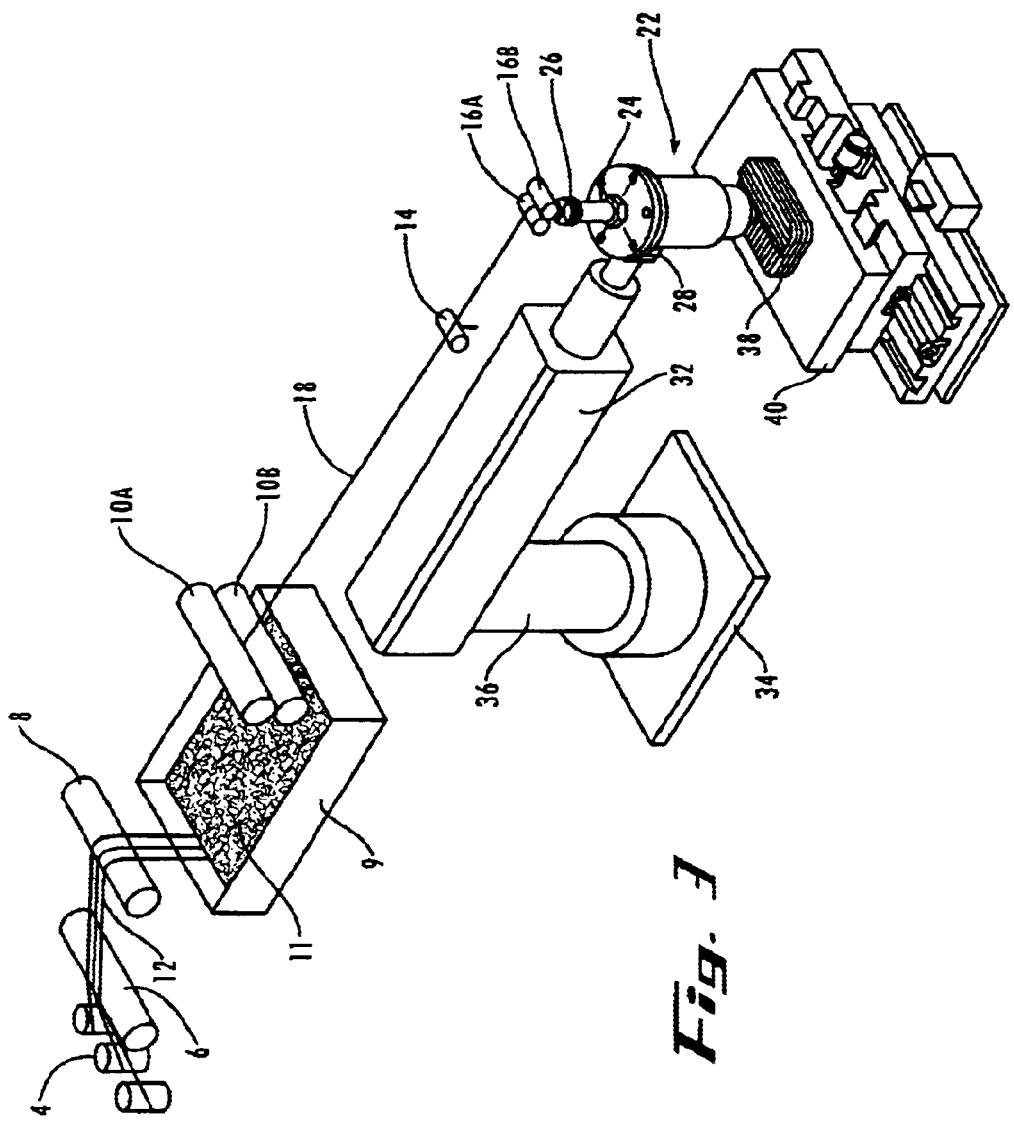
FIG. 1 shows example embodiments of a system and method of fabricating nanofiber-reinforced composite materials, and composite materials formed by such a system and method, according to an example embodiment of the present invention.

Another example to illustrate a preferred embodiment of the present invention for generating deposition paths is shown in FIG. 11. An object 300, composed of one solid cylinder 330 at the bottom and one solid cylinder 340 plus one hollow cylinder 350 with a through hole at the top, is to be built (FIG. 1 1A). If the space between cylinders 340 and 350 is not big enough to permit free maneuvering of a towpreg-dispensing nozzle, the towpreg can be dispensed layer-by layer. First, cylinder 330 can be built layer by layer from the bottom to the top. By slicing through cylinders 340 and 350, one may obtain a plurality of layers with each layer being composed of two positive solid areas (e.g., 342 and 352 in FIG. 11B). The dispensing procedure may begin from 342 and, upon completion, the dispensing is discontinued temporarily with the towpreg being cut off. The dispensing nozzle is then moved to the right with the towpreg-dispensing procedure being resumed to build 352. Upon completion of 352, the nozzle may move up in the X-axis direction for building the next layer and subsequent layers. If the space between cylinders 340 and 350 is sufficiently large so as not to have any interference on the motion of a dispensing nozzle, then this object can be built up part-by-part, first from cylinder 330, then 340, and at last 350 by using any of the previously mentioned methods. The number of path interruptions can be minimized by using this strategy.

Mathematical Modeling and Creation of Logical Layers

A preferred embodiment of the present invention is a solid freeform fabrication method in which the execution of various steps may be illustrated by the flow chart of FIG. 12. The method begins with the creation of a mathematical model (e.g., via computer-aided design, CAD), which is a data representation of a 3-D object. This solid model is stored as a set of numerical representations of layers which, together, represent the whole object. A series of data packages, each data package corresponding to the physical dimensions of an individual layer of deposited materials, is stored in the memory of a computer in a logical sequence so that the data packages correspond to individual layers of the materials stacked together to form the object. This logical sequence is dictated by the algorithm discussed previously.

Specifically, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situations, each 2-D logical layer is a plane so that each layer is flat, and the thickness is the same throughout any particular layer. However, this is not necessarily so in every case, as a layer may have any desired curvature and the thickness of a layer may be a function of position within its two dimensional surface. The only constraint on the curvature and thickness function of the logical layers is that the sequence of layers must be logically adjacent. Therefore, in considering two layers that come one after the other in the sequence, the mutually abutting surfaces of the two layers must contact each other at every point, except at such points of one layer where the corresponding point of the other layer is void of material as specified in the object model.

As summarized in the top portion of FIG. 12, the data packages for the logical layers may be created by any of the following methods:

(1) For a 3-D computer-aided design (CAD) model, by logically "slicing" the data representing the model, (2) For topographic data, by directly representing the contours of the terrain, (3) For a geometrical model, by representing successive curves which solve "z=constant" for the desired geometry in an X- Y -Z rectangular coordinate system, and (4) Other methods appropriate to data obtained by computer tomography (CT), magnetic resonance imaging (MRI), satellite reconnaissance, laser digitizing, line ranging, or other methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the curvature and thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The contour curves are the boundary between the positive and negative regions, and are called the "outline" of the layer. In the present context, the towpreg materials are allowed to be deposited in the "positive region" while a wax (or other lower-melting material) may be deposited in certain parts or all of the "negative region" in each layer to serve as a support structure. The support material can be any material that has a melting point lower than the processing temperature of the solid-building material (towpreg in the present case). The support structure may also be made from the towpreg, but in a structurally weaker form to facilitate easy removal of the support structure before or upon completion of the solid object building process.

As a specific example, the geometry of a three-dimensional object may be converted into a proper format utilizing any CAD/Solid Modeling software that is commercially available. A commonly used format is the stereo lithography file (.STL), which has become a defacto industry standard for rapid prototyping. The object geometry data may be sectioned into multiple layers by a slicing software program, which is also commercially available or can be easily developed by individual users. Each layer has its own shape and dimensions. These layers, each being composed of a plurality of segments, when combined together, will reproduce the complete shape of the intended object. When a multi-material object is desired, these segments are preferably sorted in accordance with their compositions. This can be accomplished by taking the following procedure:

When the stereo lithography (.STL) format is utilized, the geometry is represented by a large number of triangular facets that are connected to simulate the exterior and interior surfaces of the object. The triangles may be so chosen that each triangle covers one and only one material composition. In a conventional .STL file, each triangular facet is represented by three vertex points each having three coordinate points, $(x_1, y_1, z_1)$, $(x_2, y_2, z_2)$ and $(x_3, y_3, z_3)$ and normal vector (i, j, k). Each facet is now further endowed with a material feature code (e.g., to indicate material composition). During the slicing step, neighboring data points with the same material feature code on the same layer may be sorted together. These segment data are then converted into programmed signals (data for selecting deposition tools and tool paths) in a proper format, such as the standard NC G-codes commonly used in computerized numerical control (CNC) machinery industry. These layering data signals in a predetermined sequence as determined by a deposition tool path-guiding algorithm discussed earlier may be directed to a machine controller which selectively actuates the motors for moving the deposition sub-system with respect to the object-supporting platform, activates signal generators, drive the valve means in the powder dispensing device, drives the optional vacuum pump means (if any), and operates optional temperature controllers. It should be noted that although .STL file format has been emphasized in this paragraph, many other file formats have been employed in different commercial rapid prototyping and manufacturing systems. These file formats may be used in the presently invented method and each of the constituent segments for the object image may be assigned a material feature code.

The three-dimensional motion controller is electronically linked to the mechanical drive means and is operative to actuate the mechanical drive means in response to "X," "Y" "Z" axis drive signals for each layer received from the CAD computer. Controllers that are capable of driving linear motion devices are commonplace. Examples include those commonly used in a milling machine.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, CA; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments. These and other software packages (e.g. Bridgeworks from Solid Concepts, Inc.) are also available for identifying an un-supported feature in the object and for generating data files that can be used to build a support structure for the un-supported feature. The support structure may be built by a separate fabrication tool or by the same deposition device that is used to build the object.

CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Formation of the Physical Layers

The data packages are stored in the memory of a computer, which controls the operation of an automated composite fabricator comprising a material deposition subsystem, an object platform, and motion devices. Using these data packages, the computer controls the automated composite fabricator to manipulate the fabrication materials (towpreg compositions and support material) to form individual layers of materials in accordance with the specifications of an individual data package. The towpreg compositions used to form the layer contours preferably have the property that they can be readily solidified and consolidated layer-by-layer. In one embodiment of the invention, the liquid compositions and their mixtures with solid powder particles preferably have the further property that the contours of the fabrication materials when brought into contact bond to each other so that individual layers can be readily unified.

The towpreg materials do not have to be homogeneous. They may, for example, exhibit variations in composition based upon the structural or physical requirements of the desired object begin built. These variations may serve to accomplish internal variations of the physical properties of the object, such as hardness, mass density, and coefficient of thermal expansion and variations of external appearance such as color patterns. In another preferred embodiment, more than one nozzle may be used to dispense and deposit different towpregs to produce a spatially controlled material composition comprising two or more distinct types of materials.

If composition variation of a deposition material is desired within any particular layer, then the variation in composition may be represented mathematically within the data package for each layer, and the mathematical representation may be used to control the composition of materials deposited. However, if the mechanism for depositing a towpreg material is limited to providing layers of anyone specific composition at a time, then variations in composition may be accomplished by logically separating a particular layer into sub-layers, where each sub-layer is composed of a different material, and the union of the sub-layers is equal to the particular layer. Each sub-layer is then treated as a distinct layer in the deposition process, and the complete layer is formed by the formation and bonding of a succession of its constituent sublayers. If the interface between sublayers is along surfaces perpendicular to the layers, and not along surfaces parallel to the layers, then the bonding of each sub-layer is not to the previous sub-layer, but to the previous complete layer.

In summary, an embodiment of the presently invented solid freeform fabrication method comprises the steps of:
(a) combining a reinforcement fiber tow with a solidifying matrix material to form a pre impregnated tow or towpreg;
(b) providing a dispensing head (nozzle) capable of dispensing the towpreg onto a surface area of a base member (an object-supporting platform) positioned a distance from the dispensing head; the head and the member being driven by motion means electronically connected to a motion controller or indexer which is regulated by a computer; and
(c) operating and moving the dispensing head relative to the base member to dispense multiple layers of towpreg with the steps of operating and moving comprising the following sub-steps:
   (c1) creating a geometry file of the object on a computer with the geometry comprising a plurality of layers and each of such layers being composed of a plurality of thin segments which can be connected to form exterior and interior contours for delineating respectively the exterior and interior boundaries of a cross-sectional shape of this layer;
   (c2) converting the geometry file to deposition paths along which the dispensing head can be allowed to trace out individual layers by following a selected algorithm so that the number of path interruptions at which the towpreg must be cut off from said dispensing head is minimized;
   (c3) converting the deposition paths into programmed signals in a predetermined sequence; and
   (c4) responsive to these programmed signals received from the computer, operating and moving the dispensing head to deposit multiple layers of towpreg, one upon another, in this predetermined sequence to form the desired 3-D object.

A preferred embodiment is a process as set forth in the above steps, wherein the step of moving and operating (c4) includes the sub-steps of:
(d) moving the material deposition subsystem and the platform relative to one another in a direction parallel to the X-Y plane to form a first layer of the towpreg on the object platform;
(e) moving the deposition sub-system and the platform away from each other by a predetermined layer thickness; and
(f) after the portion of the first layer adjacent to a dispensing nozzle of the material deposition sub-system has substantially solidified, dispensing a second layer of the deposition materials onto the first layer while simultaneously moving the platform and the deposition sub-system relative to one another in a direction parallel to the X-Y plane, whereby the second layer solidifies and adheres to the first layer.

A further preferred embodiment is a process as set forth in the above steps, (a) through (f), further comprising additional steps of forming multiple layers of the materials on top of one another by repeated dispensing of the towpreg from the deposition devices as the platform and the deposition subsystem are moved relative to one another in a direction parallel to the X-Y plane, with the deposition sub-system and the platform being moved away from one another in the Z-direction by a predetermined layer thickness after each preceding layer has been formed, and with the dispensing of each successive layer being controlled to take place after the material in the preceding layer immediately adjacent the nozzle has substantially solidified. These steps are accomplished by operating the apparatus described above under the control of a computer system.

Another preferred embodiment is a process as set forth in the above three steps, (1) through (3) plus (a), (b) and (c), further comprising the steps of:
(4) creating an image of the three-dimensional object on a computer with the image including a plurality of segments defining the object;
(5) generating programmed signals corresponding to each of these segments in a predetermined sequence; and
(6) moving the deposition sub-system and the platform relative to one another in response to the programmed signals.

These additional steps provide computerized control over the relative motions between the deposition sub-system and the platform to build a 3-D object. However, the color pattern of an object is not necessarily predetermined. The adjustments of colors for different portions of an object can be made at any time during the object building process or in a random fashion, if so desired.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing nozzle to follow these coordinate points to trace out the perimeters of a layer cross section. These perimeters may be built with a proper towpreg material composition with the interiors built with different materials. These considerations have led to the development of another embodiment of the present invention. This is a process as set forth in the above-cited three steps, (a) through (f), wherein the moving step includes the step of moving the deposition sub-system and the platform relative to one another in a direction parallel to the X-Y plane according to a first predetermined pattern to form an outer boundary of one selected towpreg composition onto the platform. The outer boundary defines an exterior surface of the object.

Another embodiment is a process as set forth in the above paragraph, wherein the outer boundary defines an interior space in the object, and the moving step further includes the step of moving the deposition sub-system and the platform relative to one another in one direction parallel to the X-Y plane according to at least one other predetermined pattern to fill this interior space with deposition materials. The interior does not have to have the same material composition as the exterior boundary. The interior space may be built with materials of a spatially controlled composition comprising one or more distinct types of materials. With more than one towpreg-dispensing head, different towpregs may be properly combined and deposited in varying concentrations of distinct types of materials. This process may specifically comprise the steps of:
(h) creating a geometry of the object on a computer with the geometry including a plurality of segments defining the object; and
(i) generating program signals corresponding to each of these segments in a predetermined sequence, wherein the program signals determine the movement of the deposition sub-system and the platform relative to one another in the first predetermined pattern and at least one other predetermined pattern.

Preferably, the process includes additional steps of operating sensor means to periodically monitor the dimensions of individual cross-sections. The acquired data are fed-back to the CAD computer for re-calculating logical layers if, for instance, layer thickness variations are detected. Subsequent deposition procedures are then executed according to the re-calculated logical layers to correct the layer thickness discrepancy problem. As a corrective measure, for instance, the process may comprise periodically depositing thin matrix material layers to compensate for solidification shrinkage of the deposited materials. These additional steps could significantly improve the part accuracy. A separate dispensing tool for depositing the matrix material only, no reinforcement fiber, may be incorporated in the material deposition sub-system. This tool can be an inkjet printhead, an extrusion device, a thermal sprayer, etc.

While the invention has been described with reference to preferred and example embodiments, it will be understood by those skilled in the art that a variety of modifications, additions and deletions are within the scope of the invention, as defined by the following claims.

What is claimed is:

1. A method of making a composite material comprising:
   providing a mixture of nanotubes and a matrix material in a fluent state;
   extruding said mixture to form a filament wherein said nanotubes are aligned along a filament axis;
   aligning a plurality of segments of said filament in a first direction to form a nanotube-matrix filament preform; and
   consolidating said preform.

2. The method of claim 1 wherein the matrix material of said mixture is in a molten state.

3. The method of claim 1 wherein said mixture contains a liquid solvent.

4. The method of claim 1 wherein said filament is extruded through an orifice having a diameter between about 0.1 $\mu$m to about 50 $\mu$m.

5. The method of claim 1 further comprising aligning segments of said filament in a second direction to form the nanotube-matrix filament preform.

6. The method of claim 5 further comprising aligning segments of said filament in a third direction to form the nanotube-matrix filament preform.

7. The method of claim 1 wherein said aligning step comprises weaving, braiding, knitting, winding, or combinations thereof.

8. The method of claim 1 wherein said consolidating step comprises heating, pressurizing, and solidifying said matrix material.

9. A composite material comprising a matrix material and 0.5% to 50% by volume of nanotubes, wherein said nanotubes are aligned substantially parallel to each other along a first specified direction.

10. The composite material of claim 9, wherein at least 50% of said nanotubes have their elongate axis inclined at an angle of 15 degrees or less with respect to said first specified direction.

11. The composite material of claim 9, comprising at least two layers, a first layer containing nanotubes aligned predominantly along the first specified direction and a second layer containing nanotubes aligned predominantly along a second specified direction.

12. The composite material of claim 9, wherein said matrix material is selected from organic, polymeric, metallic, ceramic, glass, carbonaceous materials and combinations thereof.

13. A method of forming a composite material comprising:
   providing a mixture of nanotubes and a matrix material in a fluent state;
   extruding the mixture through an orifice to form a continuous filament;
   segmenting said filament to form filament segments;
   aligning a first plurality of the filament segments in a first direction to form a first preform layer;
   aligning a second plurality of the filament segments in a second direction generally perpendicular to the first direction to form a second preform layer; and
   consolidating the first and second preform layers.

14. A method for making a continuous fiber-reinforced composite material-based three-dimensional object, comprising:
   combining a reinforcement fiber tow with a solidifying matrix material to form a pre-impregnated tow or towpreg;
   providing a dispensing head capable of dispensing said towpreg onto a surface area of a base member positioned a distance from said dispensing head; said dispensing head and said base member being driven by motion means electronically connected to a motion controller regulated by a computer; and
   operating and moving said dispensing head relative to said base member to dispense multiple layers of towpreg; said steps of operating and moving comprising the following sub-steps:
      creating a geometry file of said object on a computer with said geometry comprising a plurality of layers and each said layer being composed of a plurality of thin segments which can be connected to form exterior and interior contours for delineating respectively the exterior and interior boundaries of a cross-sectional shape of said layer;
      converting said geometry to form deposition paths along which said dispensing head is driven to trace out individual layers by following a selected algorithm so that the number of path interruptions at which said towpreg must be cut off from said dispensing head is minimized;
      converting said deposition paths into programmed signals in a predetermined sequence; and
      in response to said programmed signals received from said computer, operating and moving said dispensing head to deposit multiple layers of towpreg, one upon another, in said sequence to form said 3-D object.

15. The method of fabricating a 3-D fiber composite object of claim 14, further comprising:
   establishing an X-Y-Z Cartesian coordinate system defined by three mutually perpendicular X, Y -and Z-axes with each said layer lying approximately parallel to an X-Y plane;
   for each said layer, defining positive solid areas with each said solid area being an area enclosed by an external contour of said layer excluding those areas enclosed by corresponding internal contours if any; and
   for each said layer, generating said deposition paths in such a fashion that the towpreg dispensed from said dispensing head approximately covers at least one of said positive solid areas entirely.

16. The method for fabricating a 3-D fiber composite object of claim 14, wherein said algorithm comprises:
   establishing an X-Y-Z Cartesian coordinate system defined by three mutually perpendicular X-, Y -and Z-axes with each said layer lying parallel to an X-Y plane;

for each said layer, defining positive solid areas with each said solid area being an area enclosed by an external contour of said layer excluding those areas enclosed by any corresponding internal contours; and for each said layer, generating said deposition paths such that the towpreg dispensed from said dispensing head covers one of said positive solid areas only partially.

17. The method of claim 15, wherein the generation of said deposition paths comprises following a raster segment method comprising:

drawing a set of parallel straight lines on said cross-sectional shape of a layer along a selected direction on an X-Y plane; each said straight line intersecting one of said contours at two points;

connecting said points of intersection to form a set of successive line segments or raster segments, each having a start point and an end point forming a vector in such a fashion that the end point of a vector is at a predetermined short distance from the start point of a neighboring vector; and defining said deposition paths by allowing said dispensing head to trace out said raster segments consecutively.

18. The method of claim 16, wherein the generation of said deposition paths comprises following a raster segment method comprising:

drawing a set of parallel straight lines on said cross-sectional shape of a layer along a selected direction on an x- y plane; each said straight line intersecting one of said contours at two points;

connecting said points of intersection to form a set of successive line segments or raster segments, each having a start point and an end point forming a vector in such a fashion that the end point of a vector is at a predetermined distance from the start point of a neighboring vector; and defining said deposition paths by allowing said dispensing head to trace out said raster segments consecutively.

19. The method of claim 14, wherein said parallel lines are substantially equally spaced and the spacing between two neighboring lines is approximately equal to the width of said towpreg.

20. The method of claim 14, wherein said algorithm comprises cutting off said towpreg at a point of interruption.

21. The method of claim 20, wherein said towpreg cutting is executed by using a tool selected from a laser beam, a sharp blade, a pair of scissors, a milling machine, a heated wire and an electrical discharging wire.

22. The method of claim 15, wherein the initial position of said dispensing head is at the origin of said Cartesian coordinate system and said algorithm includes additional steps of locating extremity points of said contours having a minimum or maximum X- or Y-coordinate value and permitting said dispensing head to start the deposition of said towpreg at a selected extremity point.

23. The method of claim 16, wherein the initial position of said dispensing head is at the origin of said Cartesian coordinate system and said algorithm includes additional steps of locating extremity points of said contours having a minimum or maximum X- or Y-coordinate value and permitting said dispensing head to start the deposition of said towpreg at a selected extremity point.

24. The method of claim 15, wherein the generation of said deposition paths comprises following a raster segment method comprising:

drawing a set of parallel straight lines on said cross-sectional shape of a layer along a selected direction on an X-Y plane; each said straight line intersecting one of said contours at two points;

connecting said points of intersection to form a set of successive line segments or raster segments, each having a start point and an end point forming a vector in such a fashion that the end point of a vector is at a predetermined distance from the start point of a neighboring vector; and defining said deposition paths by allowing said dispensing head to trace out said raster segments according to the following sequence of sub-steps:

selecting a first raster segment in a first positive solid area with the start point of said segment being an extremity point having a minimum or maximum X- or Y-coordinate value;

directing said dispensing head to begin the deposition of said towpreg from said first extremity point to the end point of said first raster segment;

if the start point of a next neighboring raster segment lies on the same contour as the end point of said first raster segment, moving said dispensing head to the start point of this neighboring raster segment and trace out said neighboring segment; otherwise, cutting off said towpreg at the end point of said first segment and move said head to the start point of another raster segment having a minimum or maximum X- or Y-coordinate value, re-starting the towpreg deposition to trace out said another segment;

repeating the previous step until said first solid area is traced out;

moving said dispensing head to another solid area and subsequent solid areas and repeating the preceding sub-steps until all solid areas are traced out.

25. The method of claim 14, wherein said algorithm comprises forming a deposition path by a contour offset method comprising:

defining positive solid areas for each said layer with each said solid area being an area enclosed by an external contour of said layer excluding those areas enclosed by corresponding internal contours if any;

positioning said dispensing head to a first start point of first exterior contour of a solid area and operating said head to deposit said towpreg along said first exterior contour from said first start point to a first end point;

moving said head inward by a off-set distance to a second start point and operating said head to deposit said towpreg along a second curve substantially parallel to said first exterior contour from said second start point to a second end point;

moving said head further inward by a off-set distance to another start point and operating said head to deposit said towpreg along another curve substantially parallel to said second curve from said another start point to another end point; and repeating the preceding step until said head reaches a desired point inside said solid area.

26. The method of claim 14, wherein said algorithm comprises forming a deposition path by a contour offset method comprising:

defining positive solid areas for each said layer with each said solid area being an area enclosed by an external contour of said layer excluding those areas enclosed by corresponding internal contours if any;

positioning said dispensing head to a first start point of an interior contour for a solid area and operating said head to deposit said towpreg along said first interior contour from said first start point to a first end point;

moving said head outward by a off-set distance to a second start point and operating said head to deposit said towpreg along a second curve substantially parallel to said first interior contour from said second start point to a second end point;

moving said head further outward by a off-set distance to another start point and operating said head to deposit said towpreg along another curve substantially parallel to said second curve from said another start point to another end point; and repeating the preceding step until said head reaches a desired point on the exterior contour of said solid area.

27. The method of claim 14, wherein said algorithm comprises forming a deposition path in a spiral fashion.

28. The method of claim 14, wherein said algorithm comprises forming a deposition path by a sub-area method comprising:

establishing an X-Y-Z Cartesian coordinate system defined by three mutually perpendicular X-, Y -and Z-axes with each said layer lying approximately parallel to an X-Y plane;

for each said layer, defining positive solid areas with each said solid area being an area enclosed by an exterior contour of said layer excluding those areas enclosed by corresponding interior contours if any;

locating convex portions of an exterior contour and/or concave portions of an interior contour with each said portion having at least two extremum points and/or one point of inflection;

drawing a line tangent to one said portion at a first of said extremum points with said tangent being extended to intersect said portion at a first point of intersection, said first extremum point and said first point of intersection forming a first boundary line;

drawing a second boundary line from a second of said extremum points to intersect said first boundary line at a second point of intersection; said first and second extremum points being such that if one is a maximum the other is a minimum and said second point of intersection intersecting no other point on said contour portion; the curve segment of said contour portion bounded by said first extremum point and said first point of intersection along with said first and second boundary lines defining two sub-areas; and obtaining a deposition path in such a fashion that said dispensing head being directed to trace out one of said sub-area first and then trace out the other said sub-area.

29. The method of claim 14, wherein said programmed signals comprising signals in terms of standard NC G-codes and/or M codes commonly used in computerized numerical control machining industry.

30. The method of claim 14, wherein said algorithm comprises a strategy that, if two or more said positive solid areas corresponding to two or more components of said object exist and the space between neighboring components is sufficiently large to accommodate said dispensing head, said dispensing head and said motion means may be operated to build one said component to a desired thickness first before moving to build a second component.

31. The method of claim 14, further comprising:

evaluating said geometry data files representing said object to locate any un-supported feature of said object;

defining a support structure for an un-supported feature and creating a plurality of thin segments defining said support structure;

generating program signals corresponding to each of said segments for said support structure in a predetermined sequence; and operating a material-depositing tool to form said support structure layer by layer.

32. The method of claim 14, wherein said towpreg can be oriented along a different direction in different regions of a layer or in different layers.

33. The method of claim 14, further comprising additional steps of dispensing said towpreg along a Z-axis direction at predetermined locations.

34. The method of claim 14, wherein said towpreg can be of different types and can be dispensed along a different direction in different regions of a layer or in different layers.

35. The method of claim 14, wherein the moving step comprises:

moving said dispensing head and said base member relative to one another in a direction parallel to an X-Y plane, defined by two mutually perpendicular X- and Y coordinate axes, to form a first layer of said towpreg on said base member;

moving said head and said base member away from one another in a third or Z-axis direction perpendicular to said x- y plane by a predetermined layer thickness; and after the portion of said first layer adjacent to said head has substantially solidified, dispensing a second layer of said towpreg materials onto said first layer while simultaneously moving said base member and said head relative to one another in a direction parallel to said plane, whereby said second layer solidifies and adheres to said first layer.

36. The method of claim 35, further comprising forming multiple layers of said towpreg on top of one another by repeated dispensing and depositing of said towpreg from said head as said base member and said head are moved relative to one another in a direction parallel to said plane, with said head and said base member being moved away from one another in said third direction by a predetermined layer thickness after each preceding layer has been formed and with the depositing of each successive layer being controlled to take place after said deposited materials in the preceding layer immediately adjacent said head have substantially solidified.

37. The method of claim 14, wherein each of said thin segments is coded with a material composition and said towpreg-dispensing head is provided with at least another material dispensing tool for depositing another towpreg material or another solidifying material.

38. The method of claim 37, wherein said moving step includes the step of moving said head and said base member relative to one another in a direction parallel to said plane according to a first predetermined pattern to form an outer boundary from at least one of said towpreg materials on said base member, said outer boundary defining an exterior surface of said object.

39. The method of claim 38, wherein said outer boundary defines an interior space in said object, and said moving step further includes the step of moving said dispensing head and/or said at least material dispensing tool relative to said base member in one direction parallel to said plane according to at least one other predetermined pattern to fill said interior space with said towpreg or said another solidifying material.

40. The method of claim 39, wherein said interior space is deposited with a spatially controlled material composition comprising two or more distinct types of materials.

41. The method of claim 40, wherein said distinct types of materials are deposited at discrete locations in three-dimensional part space to form a spatially controlled material composition part.

42. The method of claim 14, further comprising using dimension sensor means to periodically measure dimensions of the object being built;

using a computer to determine the thickness and outline of individual layers of said towpreg deposited in accordance with a computer aided design representation of said object; said computer being operated to calculate a first set of logical layers with specific thickness and outline for each layer and then periodically re-calculate another set of logical layers after comparing the dimension data acquired by said sensor means with said computer aided design representation in an adaptive manner.

* * * * *